(12) United States Patent
Shiotsu

(10) Patent No.: US 9,810,271 B2
(45) Date of Patent: Nov. 7, 2017

(54) CLUTCH MECHANISM AND TRANSMISSION

(71) Applicant: KABUSHIKI KAISHA TOYOTA CHUO KENKYUSHO, Nagakute-shi, Aichi-ken (JP)

(72) Inventor: Isamu Shiotsu, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 112 days.

(21) Appl. No.: 14/781,707

(22) PCT Filed: Apr. 14, 2014

(86) PCT No.: PCT/JP2014/060625
§ 371 (c)(1),
(2) Date: Oct. 1, 2015

(87) PCT Pub. No.: WO2014/171424
PCT Pub. Date: Oct. 23, 2014

(65) Prior Publication Data
US 2016/0040726 A1    Feb. 11, 2016

(30) Foreign Application Priority Data

Apr. 15, 2013 (JP) ................................ 2013-084995

(51) Int. Cl.
*F16H 3/08* (2006.01)
*F16D 21/04* (2006.01)
(Continued)

(52) U.S. Cl.
CPC .............. *F16D 21/04* (2013.01); *F16D 11/14* (2013.01); *F16H 3/30* (2013.01);
(Continued)

(58) Field of Classification Search
CPC ........... F16D 11/04; F16D 11/08; F16D 11/14
(Continued)

(56) References Cited

U.S. PATENT DOCUMENTS 7,153,227 B2 * 12/2006 Dell ...................... F16H 55/36
474/70
9,217,476 B2 * 12/2015 Roby ...................... F16D 27/11
(Continued)

FOREIGN PATENT DOCUMENTS

| JP | 2010-506113 A | 2/2010 |
| JP | 2010-216565 A | 9/2010 |
| JP | 2012-127471 A | 7/2012 |

OTHER PUBLICATIONS

Jul. 15, 2014 Search Report issued in International Patent Application No. PCT/JP2014/060625.

*Primary Examiner* — Ha D Ho
(74) *Attorney, Agent, or Firm* — Oliff PLC

(57) ABSTRACT

Under the condition that the rotation speed of a first rotating shaft is higher than that of a second rotating shaft, supported portions go through right-handed helical flutes to perform an engaging operation. Under the condition that the rotation speed of the first rotating shaft is lower than that of the second rotating shaft, the supported portions go through left-handed helical flutes to perform the engaging operation. In a releasing operation, the supported portions go through the right-handed helical flutes to release a clutch mechanism under the condition that the rotation speed of the first rotating shaft is lower than that of the second rotating shaft, and the supported portions go through the left-handed helical flutes to release the clutch mechanism under the condition that the rotation speed of the first rotating shaft is higher than that of the second rotating shaft.

6 Claims, 32 Drawing Sheets

(51) Int. Cl.
   *F16D 11/14* (2006.01)
   *F16H 3/30* (2006.01)
   F16D 11/00 (2006.01)
   F16H 63/30 (2006.01)

(52) U.S. Cl.
   CPC .. *F16D 2011/004* (2013.01); *F16D 2011/006* (2013.01); *F16D 2300/24* (2013.01); *F16H 2063/3093* (2013.01)

(58) Field of Classification Search
   USPC .......................................................... 74/325
   See application file for complete search history.

(56) References Cited

U.S. PATENT DOCUMENTS

| | | | |
|---|---|---|---|
| 9,267,552 B2* | 2/2016 | Boyes | F02B 67/06 |
| 9,556,918 B2* | 1/2017 | Staniewicz | B60K 25/02 |
| 2009/0325765 A1 | 12/2009 | Humer et al. | |
| 2010/0122882 A1* | 5/2010 | Komorowski | F16D 27/105 |
| | | | 192/35 |
| 2013/0228027 A1 | 9/2013 | Ikeya et al. | |

\* cited by examiner

CLUTCH MECHANISM AND TRANSMISSION

TECHNICAL FIELD

The present invention relate to a clutch mechanism which connects/disconnects power, and a transmission comprising the clutch mechanism.

BACKGROUND ART

A related art of a clutch mechanism which connects/disconnects power is disclosed in Patent Literature 1. The clutch mechanism in Patent Literature 1 is a synchronous self-shifting clutch (SSS clutch), wherein a switch sleeve rotates at a rotation speed of a steam turbine until the switch sleeve reaches a synchronous rotation speed, and the switch sleeve is firmly held by a claw of a switch portion of a power generator shaft if the switch sleeve reaches the synchronous rotation speed. If the switch sleeve exceeds the synchronous rotation speed, the switch sleeve is moved in an axial direction in the direction of the steam turbine by a helical screw. After a short time, teeth of the switch sleeve and teeth of the power generator shaft engage with each other, and power is transmitted via the teeth. On the contrary, if the rotation speed of the steam turbine becomes lower than the synchronous rotation speed, the switch sleeve is moved in an axial direction movement in a direction opposite to the steam turbine by the helical screw, and the teeth of the switch sleeve and the teeth of the power generator shaft disengage from each other so that the transmission of the power is cut off.

CITATION LIST

Patent Literature

Patent Literature 1: JP 2010-506113 A

SUMMARY OF INVENTION

Technical Problem

In the SSS clutch of Patent Literature 1, the teeth of the switch sleeve and the teeth of the power generator shaft engage with each other when driven from a driving side (steam turbine), and no power by a power source other than the steam turbine is needed to maintain the engaged state. However, the transition from the released state to the engaged state is limited to a condition in which the rotation speed of the driving side (steam turbine) has increased and reached the rotation speed of the driven side (power generator shaft), and the transition from the engaged state to the released state of the SSS clutch is limited to a condition in which the rotation speed of the driving side has decreased and become lower than the rotation speed of the driven side. Thus, under the condition that the rotation speed of the driving side (steam turbine) is lower than the rotation speed of the driven side (power generator shaft), an engaging operation of the SSS clutch (an operation for moving the teeth of the switch sleeve into engagement with the teeth of the power generator shaft) can not be performed. Moreover, a releasing operation of the SSS clutch such that the rotation speed of the driving side is higher than the rotation speed of the driven side (an operation for moving the teeth of the switch sleeve out of engagement with the teeth of the power generator shaft) can not be performed either.

An advantage of the present invention is to provide a clutch mechanism which can connect/disconnect power between a first rotation member and a second rotation member regardless of the condition of rotation speeds of the first rotation member and the second rotation member and which does not require power to maintain an engaged state of the first rotation member and the second rotation member. Another advantage of the present invention is to provide a transmission which uses the clutch mechanism to perform an upshift and a downshift.

Solution to Problem

A clutch mechanism and a transmission according to the present invention take the following measures to achieve at least part of the above-mentioned objects.

A clutch mechanism according to the present invention includes a first rotation member, a movable member provided with an engaging portion, and a second rotation member provided with an engagement portion configured to engage with the engaging portion of the movable member. The first rotation member is provided with a supporting portion which supports the movable member. The movable member is movable relative to the first rotation member along the supporting portion. The supporting portion includes a non-engaging portion which supports the movable member at a position where the engaging portion of the movable member does not engage with the engagement portion of the second rotation member, a right-handed helical portion and a left-handed helical portion located closer to the second rotation member side than the non-engaging portion, a branch portion which branches into the right-handed helical portion and the left-handed helical portion from the non-engaging portion, and a joining portion which is located closer to the second rotation member side than the branch portion and in which the right-handed helical portion and the left-handed helical portion join. When the support position where the movable member is supported by the supporting portion has moved from the non-engaging portion to the branch portion, the engagement between the engaging portion of the movable member and the engagement portion of the second rotation member starts. The clutch mechanism further includes a restriction mechanism which restricts the movement of the movable member relative to the first rotation member when the support position where the movable member is supported by the supporting portion is a joining portion.

In one aspect of the present invention, it is preferable that the clutch mechanism further includes a load generation mechanism which applies, to the movable member, a load in a direction away from the second rotation member.

In one aspect of the present invention, it is preferable that the movable member is provided with a supported portion which is supported by the supporting portion, and an abutment surface, on which the supported portion abuts when the load by the load generation mechanism is applied to the movable member, is formed in at least one of the right-handed helical portion and the left-handed helical portion.

A transmission according to the present invention includes a first rotation member, a first movable member provided with a first engaging portion, a first gear member which includes a first gear and which is provided with a first engagement portion configured to engage with the first engaging portion of the first movable member, a second movable member provided with a second engaging portion, a second gear member which includes a second gear and which is provided with a second engagement portion configured to engage with the second engaging portion of the second movable member, and a second rotation member which rotates together with a third gear that engages with the first gear and a fourth gear that engages with the second gear. A gear ratio between the first gear and the third gear is different from a gear ratio between the second gear and the fourth gear. The first rotation member is provided with a first supporting portion which supports the first movable member, and a second supporting portion which supports the second movable member. The first movable member is movable relative to the first rotation member along the first supporting portion. The second movable member is movable relative to the first rotation member along the second supporting portion. The first supporting portion includes a first non-engaging portion which supports the first movable member at a position where the first engaging portion of the first movable member does not engage with the first engagement portion of the first gear member, a first right-handed helical portion and a first left-handed helical portion located closer to the first gear member side than the first non-engaging portion, a first branch portion which branches into the first right-handed helical portion and the first left-handed helical portion from the first non-engaging portion, and a first joining portion which is located closer to the first gear member side than the first branch portion and in which the first right-handed helical portion and the first left-handed helical portion join. When the support position where the first movable member is supported by the first supporting portion has moved from the first non-engaging portion to the first branch portion, the engagement between the first engaging portion of the first movable member and the first engagement portion of the first gear member starts. The second supporting portion includes a second non-engaging portion which supports the second movable member at a position where the second engaging portion of the second movable member does not engage with the second engagement portion of the second gear member, a second right-handed helical portion and a second left-handed helical portion located closer to the second gear member side than the second non-engaging portion, a second branch portion which branches into the second right-handed helical portion and the second left-handed helical portion from the second non-engaging portion, and a second joining portion which is located closer to the second gear member side than the second branch portion and in which the second right-handed helical portion and the second left-handed helical portion join. When the support position where the second movable member is supported by the second supporting portion has moved from the second non-engaging portion to the second branch portion, the engagement between the second engaging portion of the second movable member and the second engagement portion of the second gear member starts. The clutch mechanism further includes a first restriction mechanism which restricts the movement of the first movable member relative to the first rotation member when the support position where the first movable member is supported by the first supporting portion is a first joining portion, and a second restriction mechanism which restricts the movement of the second movable member relative to the first rotation member when the support position where the second movable member is supported by the second supporting portion is a second joining portion.

In one aspect of the present invention, it is preferable that the clutch mechanism further includes a first load generation mechanism which applies, to the first movable member, a load in a direction away from the first gear member, and a second load generation mechanism which applies, to the second movable member, a load in a direction away from the second gear member.

In one aspect of the present invention, it is preferable that the first movable member is provided with a first supported portion which is supported by the first supporting portion, and the second movable member is provided with a second supported portion which is supported by the second supporting portion. It is preferable that a first abutment surface on which the first supported portion abuts when the load by the first load generation mechanism is applied to the first movable member is formed in at least one of the first right-handed helical portion and the first left-handed helical portion, and a second abutment surface on which the second supported portion abuts when the load by the second load generation mechanism is applied to the second movable member is formed in at least one of the second right-handed helical portion and the second left-handed helical portion.

Advantageous Effects of Invention

In the clutch mechanism according to the present invention, power can be connected/disconnected between a first rotation member and a second rotation member regardless of the condition of rotation speeds of the first rotation member and the second rotation member, and power to maintain an engaged state of the first rotation member and the second rotation member can be made unnecessary. In a transmission according to the present invention, this clutch mechanism can be used to perform an upshift and a downshift.

DESCRIPTION OF EMBODIMENT

Hereinafter, a mode for carrying out the present invention (hereinafter referred to as an embodiment) will be described with reference to the drawings.

Figure 1:
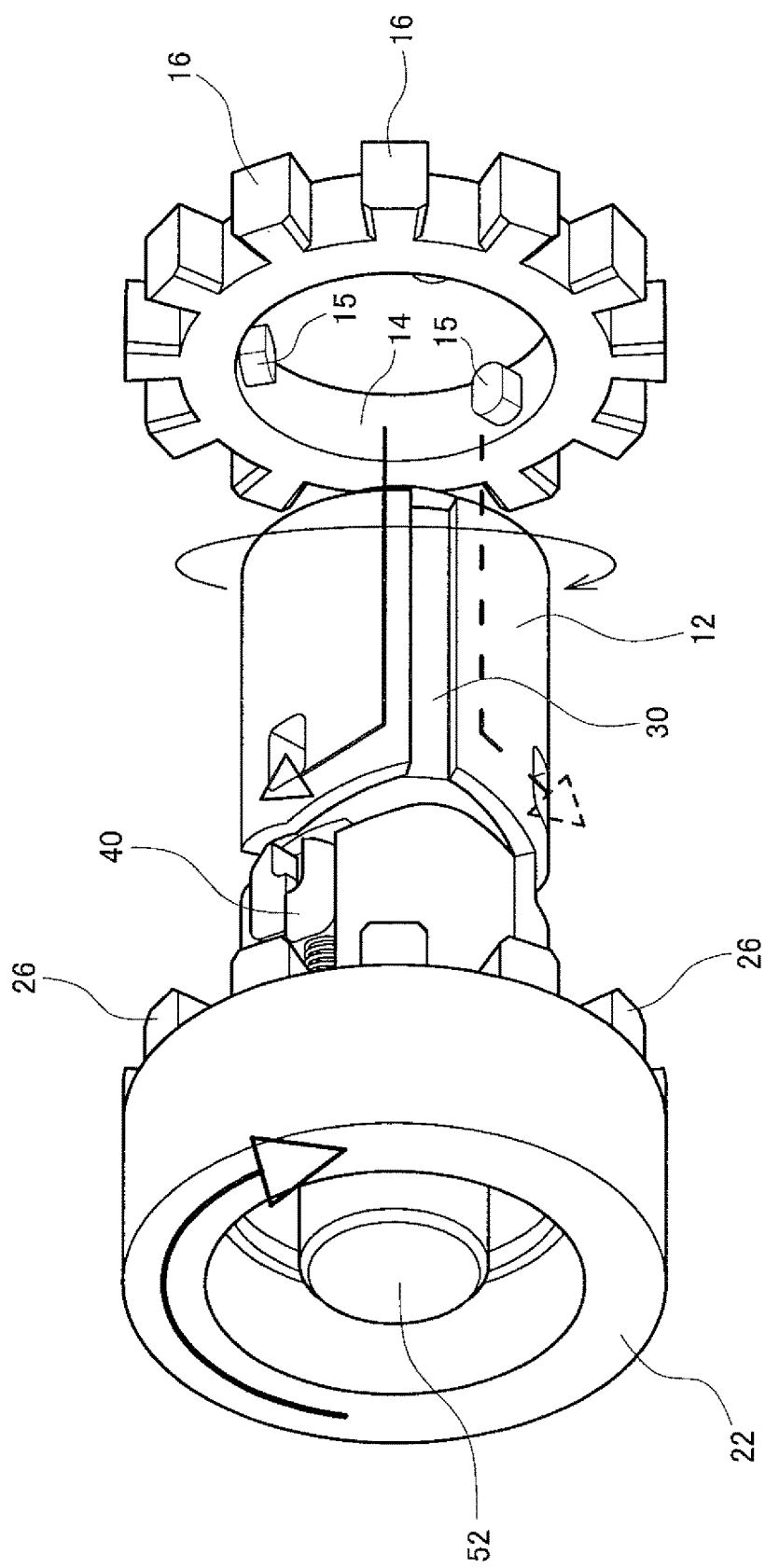
FIG. 1 is a diagram showing a schematic configuration of a clutch mechanism according to an embodiment of the present invention.
Figure 2:
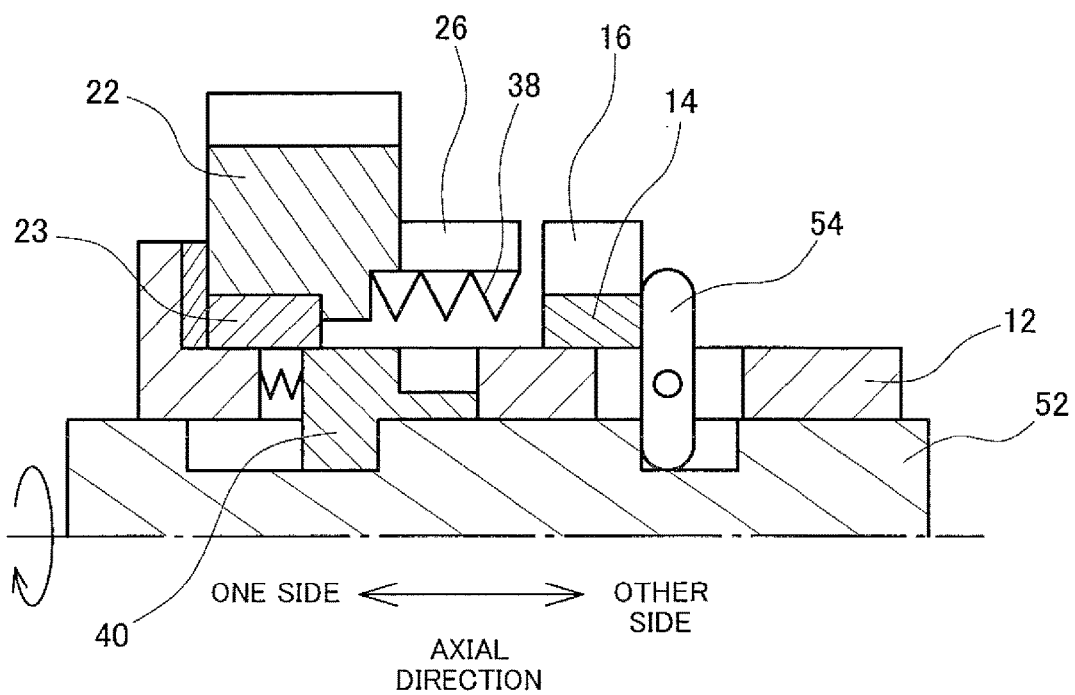
FIG. 2 is a diagram showing a schematic configuration of the clutch mechanism according to the embodiment of the present invention.
Figure 3:
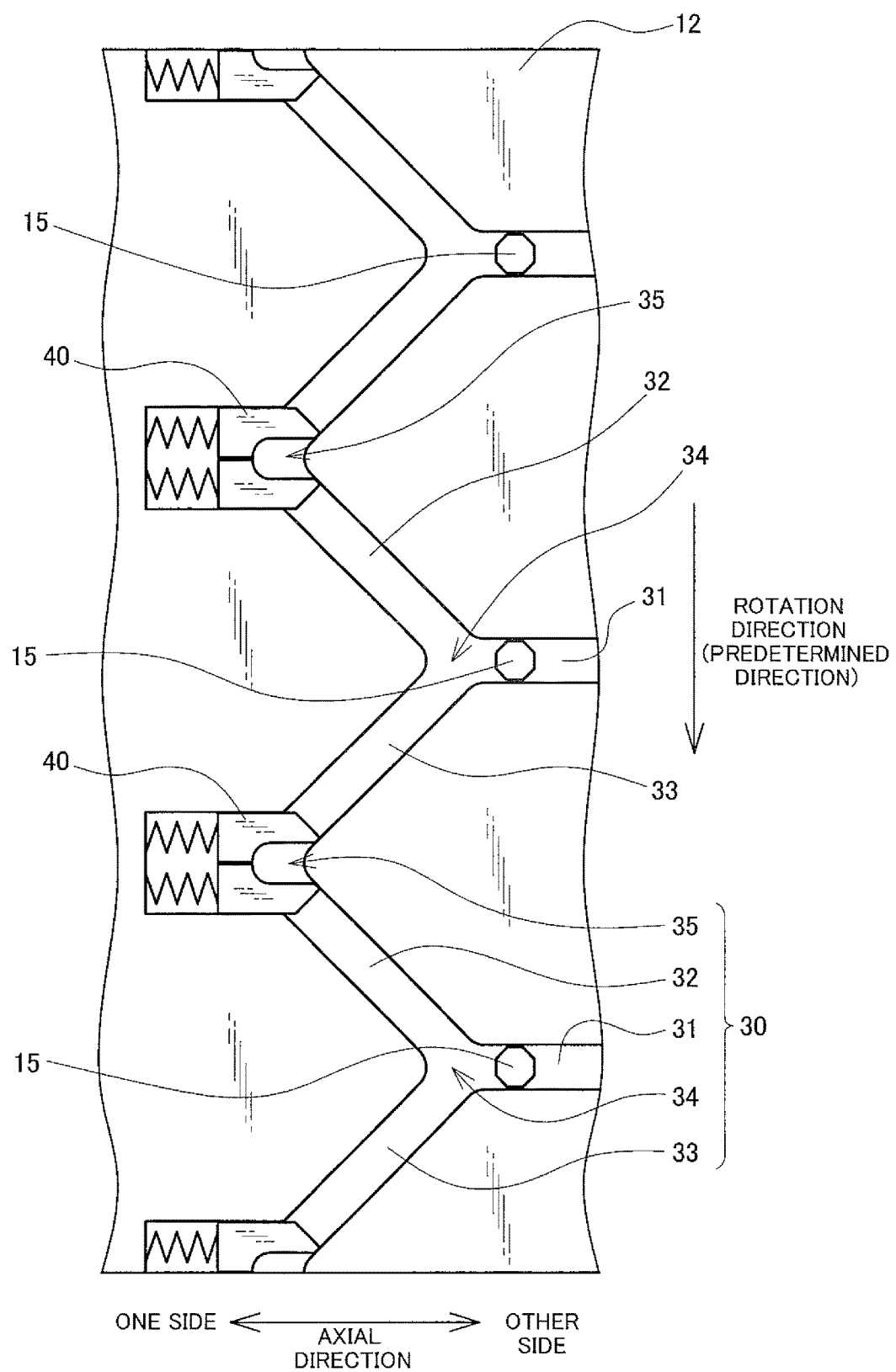
FIG. 3 is a diagram showing a schematic configuration of the clutch mechanism according to the embodiment of the present invention.

FIGS. 1 to 3 are diagrams showing a schematic configuration of a clutch mechanism according to an embodiment of the present invention. FIG. 1 shows a perspective view of the primary configuration, FIG. 2 shows a sectional view of the primary configuration seen from a direction that intersects at right angles with the axial direction of first and second rotating shafts 12 and 22. FIG. 3 shows an expansion plan in which the outer circumferential surface of the first rotating shaft 12 is expanded along the circumferential direction. The first rotating shaft 12 as a first rotation member rotates in a predetermined direction as a result of the transmission of power from a driving source such as an engine or a motor. A supporting flute 30 for supporting a sleeve 14 as a movable member is formed in the outer circumference of the first rotating shaft 12. On the inner circumference of the sleeve 14, a plurality of (three in the example shown in FIGS. 1 and 3) supported portions 15 are provided with spaces left between one another (e.g. at equal intervals of 120°) in the circumferential direction. When each of the supported portions 15 fits into the supporting flute 30 of the first rotating shaft 12, the sleeve 14 is supported by the first rotating shaft 12. Each of the supported portions 15 of the sleeve 14 is movable along the extending direction of the supporting flute 30, so that the sleeve 14 can move relative to the first rotating shaft 12 along the supporting flute 30. Moreover, on the outer circumference of the sleeve 14, a plurality of engaging teeth 16 are provided with spaces left between one another (at equal intervals) in the circumferential direction. In FIG. 1, the first rotating shaft 12 and the sleeve 14 are separately shown.

The second rotating shaft 22 as a second rotation member is disposed coaxially with the first rotating shaft 12, and is rotatably supported by the first rotating shaft 12 via a bearing 23. The second rotating shaft 22 is disposed closer to one side (the left side in FIG. 2) than the sleeve 14 in the axial direction of the first and second rotating shafts 12 and 22 (hereinafter simply referred to as the axial direction). On the end face of the second rotating shaft 22 on the other side (the right side in FIG. 2) in the axial direction, a plurality of engagement teeth 26 are provided with spaces left between one another (at intervals equal to those of the engaging teeth 16) in the circumferential direction. The engaging teeth 16 of the sleeve 14 are arranged to face the engagement teeth 26 of the second rotating shaft 22 in the axial direction, and can mesh (engage) with the engagement teeth 26 of the second rotating shaft 22.

As shown in the expansion plan in FIG. 3, the supporting flute 30 of the first rotating shaft 12 has a non-engaging flute 31 extending along the axial direction, a right-handed helical flute 32 and a left-handed helical flute 33 located closer to one side (the second rotating shaft 22 side) than the non-engaging flute 31 in the axial direction, a flute branch portion 34 which branches into the right-handed helical flute 32 and the left-handed helical flute 33 from the non-engaging flute 31, and a flute joining portion 35 which is located closer to one side (the second rotating shaft 22 side) than the flute branch portion 34 in the axial direction and in which the right-handed helical flute 32 and the left-handed helical flute 33 join. In the example shown in FIG. 3, three non-engaging flutes 31, three right-handed helical flutes 32, three left-handed helical flutes 33, three flute branch portions 34, and three flute joining portions 35 are formed, respectively. The three non-engaging flutes 31 are arranged with spaces left between one another (at intervals equal to those of the supported portions 15 of the sleeve 14) in the circumferential direction. The three flute branch portions 34 are also arranged with spaces left between one another (at intervals equal to those of the supported portions 15 and the non-engaging flutes 31) in the circumferential direction. The three flute joining portions 35 are also arranged with spaces left between one another (at intervals equal to those of the supported portions 15, the non-engaging flutes 31, and the flute branch portions 34) in the circumferential direction. Each of the right-handed helical flutes 32 is right-handedly spirally formed from the flute joining portion 35 toward the flute branch portion 34 (from one side to the other side in the axial direction). Each of the left-handed helical flutes 33 is left-handedly spirally formed from the flute joining portion 35 toward the flute branch portion 34 (from one side to the other side in the axial direction). The three right-handed helical flutes 32 have an equal torsion angle, and the three left-handed helical flutes 33 have an equal torsion angle. The right-handed helical flutes 32 and the left-handed helical flutes 33 may have the same degree of torsion angle or may have different degrees of torsion angles. The right-handed helical flutes 32 and the left-handed helical flutes 33 may have a constant torsion angle or a continuously changing torsion angle or an intermittently changing torsion angle from the flute joining portion 35 to the flute branch portion 34. Regarding the non-engaging flutes 31, the right-handed helical flutes 32, the left-handed helical flutes 33, the flute branch portions 34, and the flute joining portions 35, the number of each of them may be a plural number other than three, or may be one.

As shown in FIG. 3, when the supported portions 15 of the sleeve 14 fit in the non-engaging flutes 31, that is, when the positions of the sleeve 14 that are supported by the supporting flutes 30 are the non-engaging flutes 31, the engaging teeth 16 of the sleeve 14 do not mesh (do not engage) with the engagement teeth 26 of the second rotating shaft 22. In this case, the supported portions 15 of the sleeve 14 are movable along the extending direction (axial direction) of the non-engaging flutes 31, so that the sleeve 14 can move relative to the first rotating shaft 12 in the axial direction.

Figure 4:
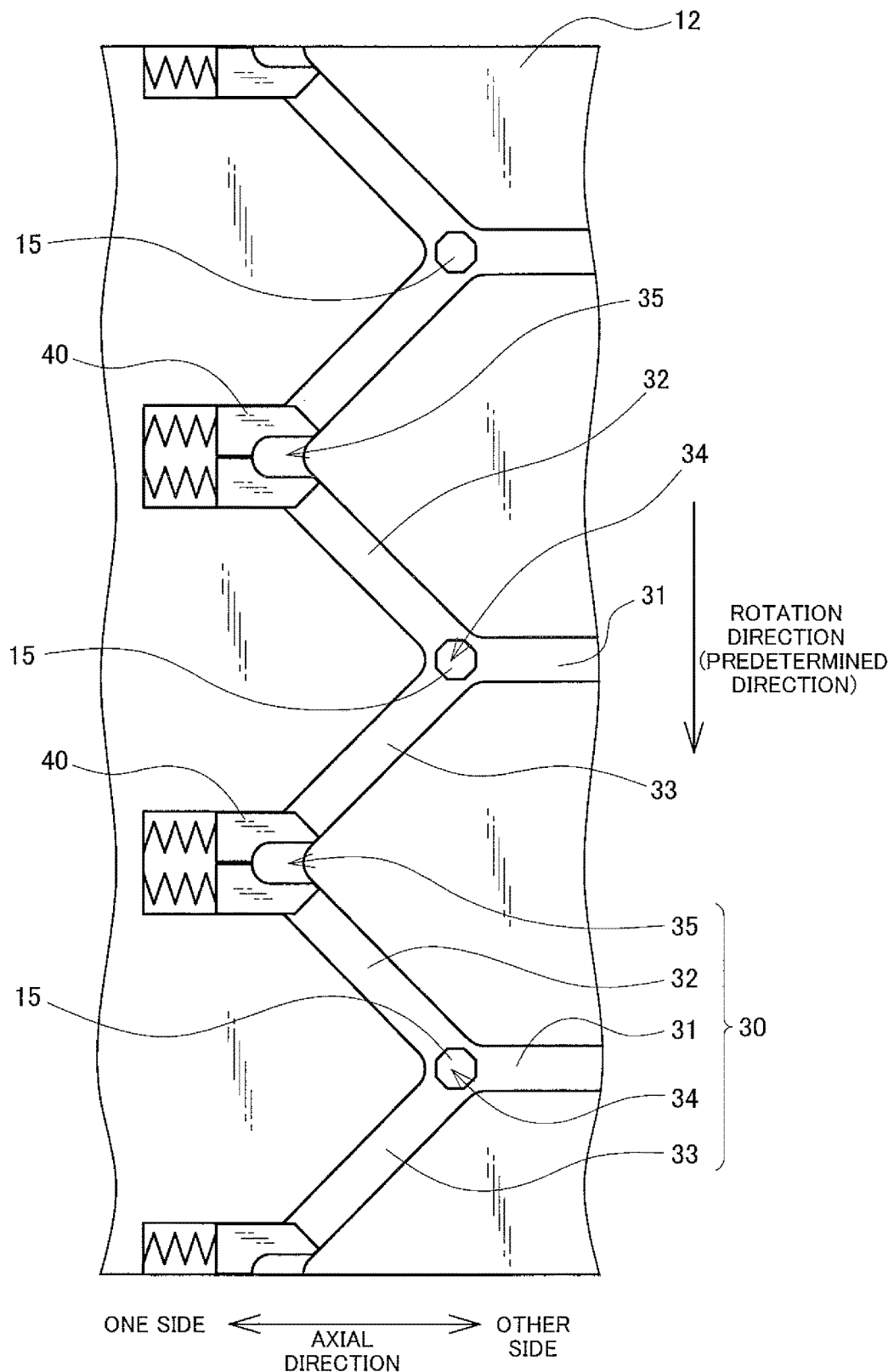
FIG. 4 is a diagram illustrating an operation of the clutch mechanism according to the embodiment of the present invention.

As shown in FIG. 4, when the supported portions 15 of the sleeve 14 have moved to one side in the axial direction from the non-engaging flutes 31 and fit in the flute branch portions 34, that is, when the positions of the sleeve 14 that are supported by the supporting flutes 30 have moved to the flute branch portions 34 from the non-engaging flutes 31, the engaging teeth 16 of the sleeve 14 start to mesh (start to engage) with the engagement teeth 26 of the second rotating shaft 22.

Figure 5:
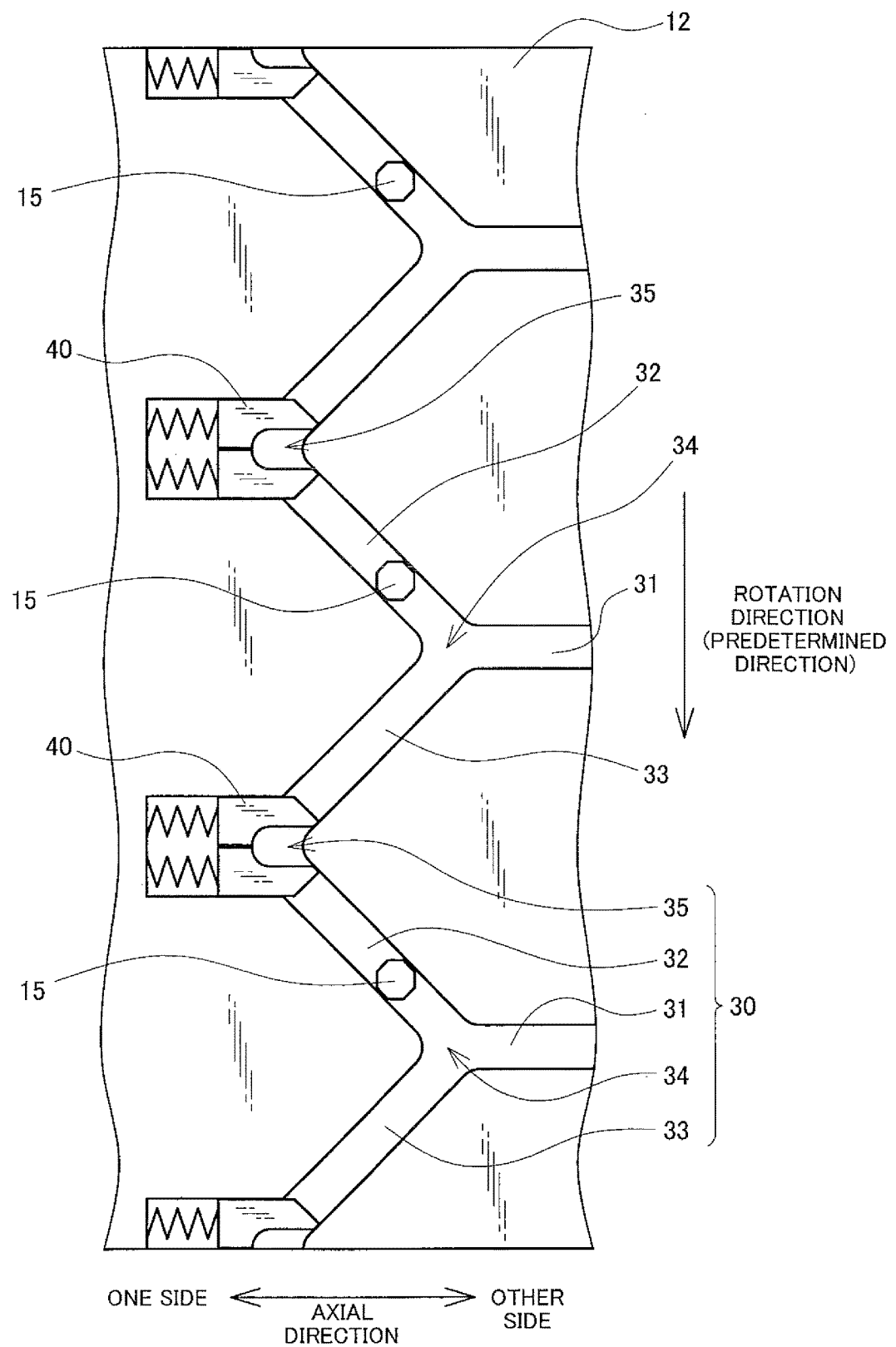
FIG. 5 is a diagram illustrating an operation of the clutch mechanism according to the embodiment of the present invention.
Figure 6:
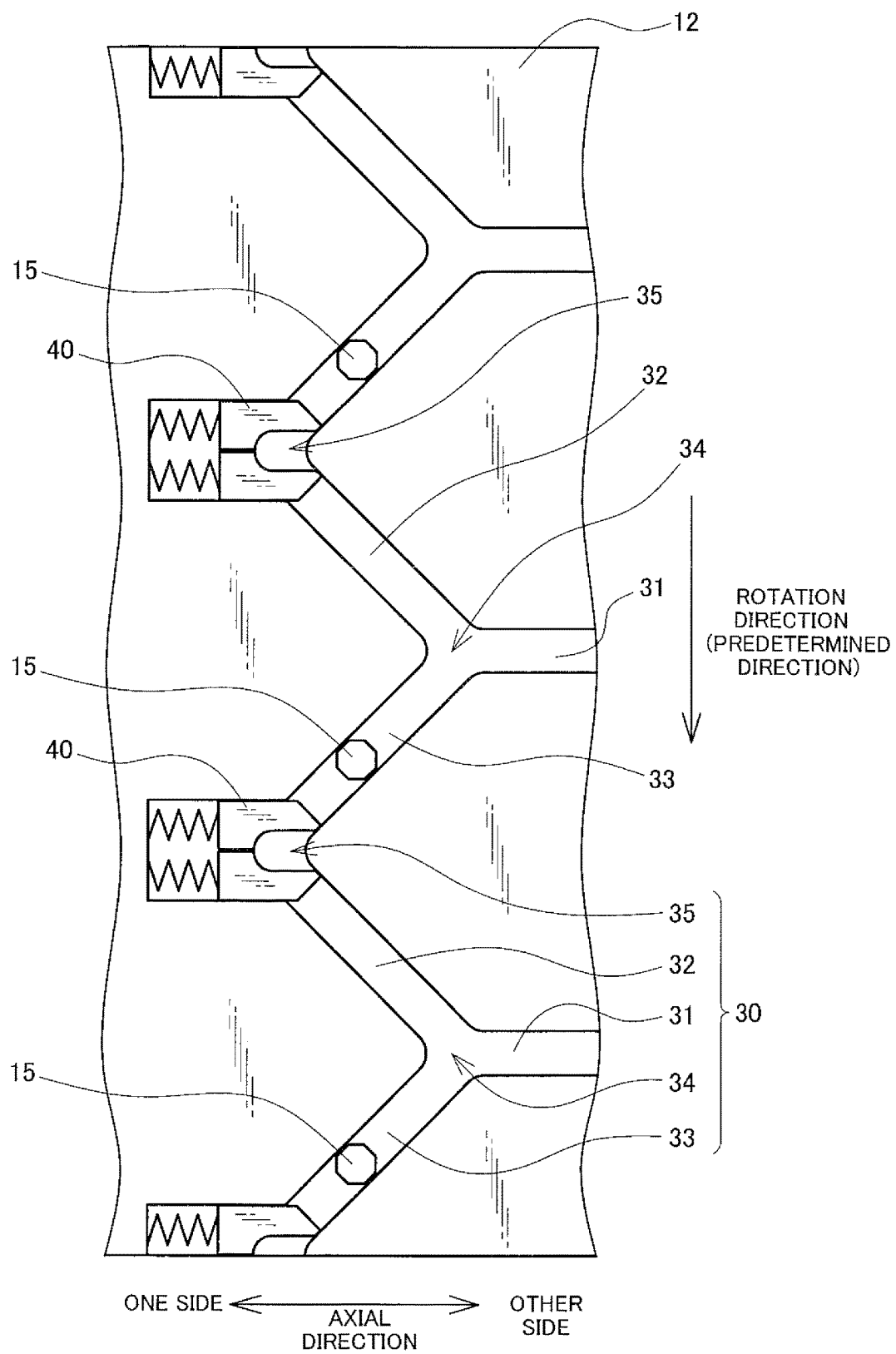
FIG. 6 is a diagram illustrating an operation of the clutch mechanism according to the embodiment of the present invention.

As shown in FIG. 5 or FIG. 6, when the supported portions 15 of the sleeve 14 fit in the right-handed helical flutes 32 or the left-handed helical flutes 33, that is, when the positions of the sleeve 14 that are supported by the supporting flutes 30 are the right-handed helical flutes 32 or the left-handed helical flutes 33, the engaging teeth 16 of the sleeve 14 are partly meshed (partly engaged) with the engagement teeth 26 of the second rotating shaft 22. In this case, the supported portions 15 of the sleeve 14 are movable along the extending direction of the right-handed helical flutes 32 or the left-handed helical flutes 33, so that the sleeve 14 can move relative to the first rotating shaft 12 in the axial direction while relatively rotating. As the supported portions 15 of the sleeve 14 come closer to the flute joining portions 35 (come away from the flute branch portions 34), the extent to which the engaging teeth 16 of the sleeve 14 mesh with the engagement teeth 26 of the second rotating shaft 22 increases.

Figure 7:
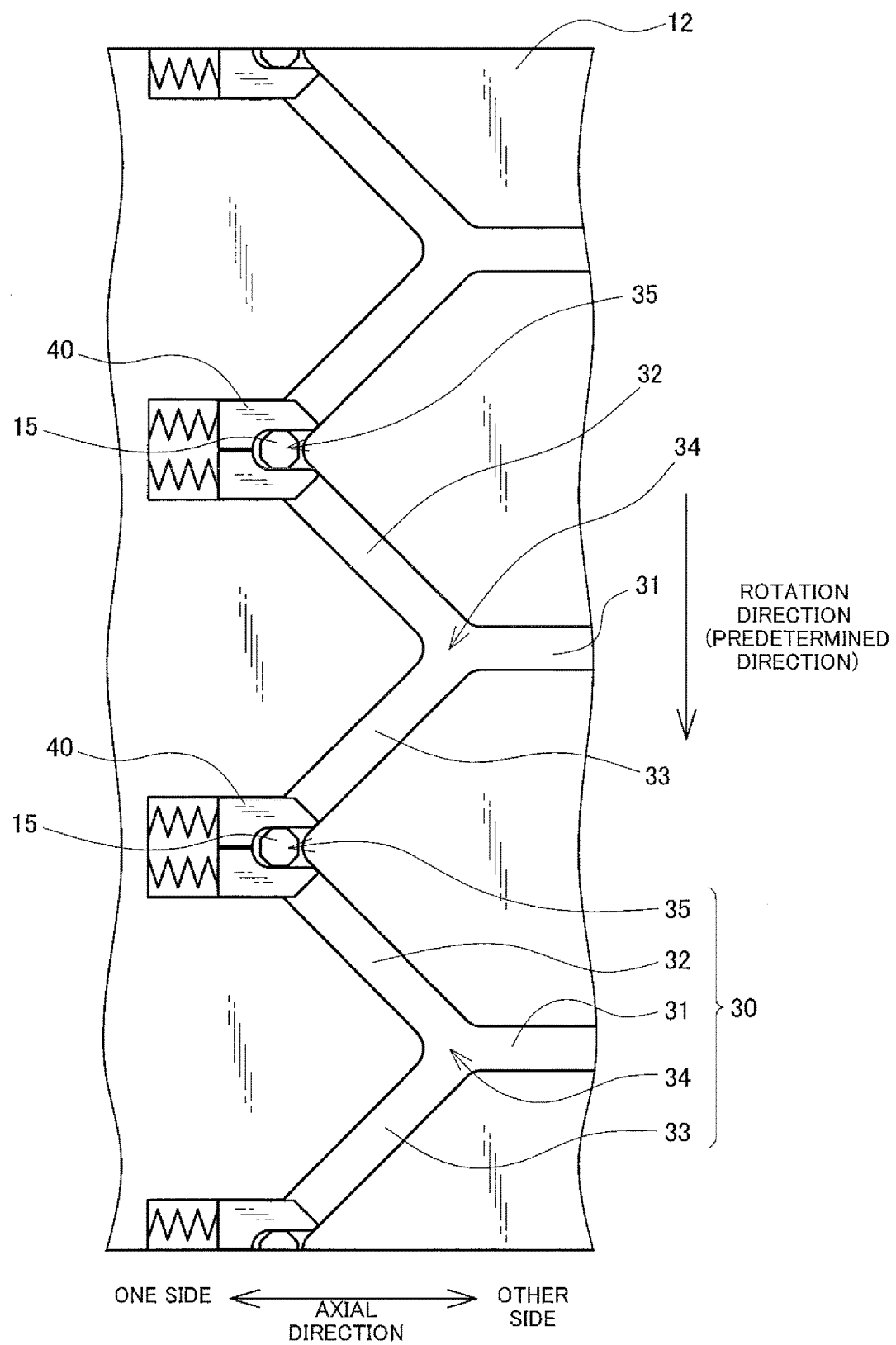
FIG. 7 is a diagram illustrating an operation of the clutch mechanism according to the embodiment of the present invention.

As shown in FIG. 7, when the supported portions 15 of the sleeve 14 fit in the flute joining portions 35, that is, when the positions of the sleeve 14 that are supported by the supporting flutes 30 are the flute joining portions 35, the engaging teeth 16 of the sleeve 14 completely mesh (engage) with the engagement teeth 26 of the second rotating shaft 22.

Figure 8:
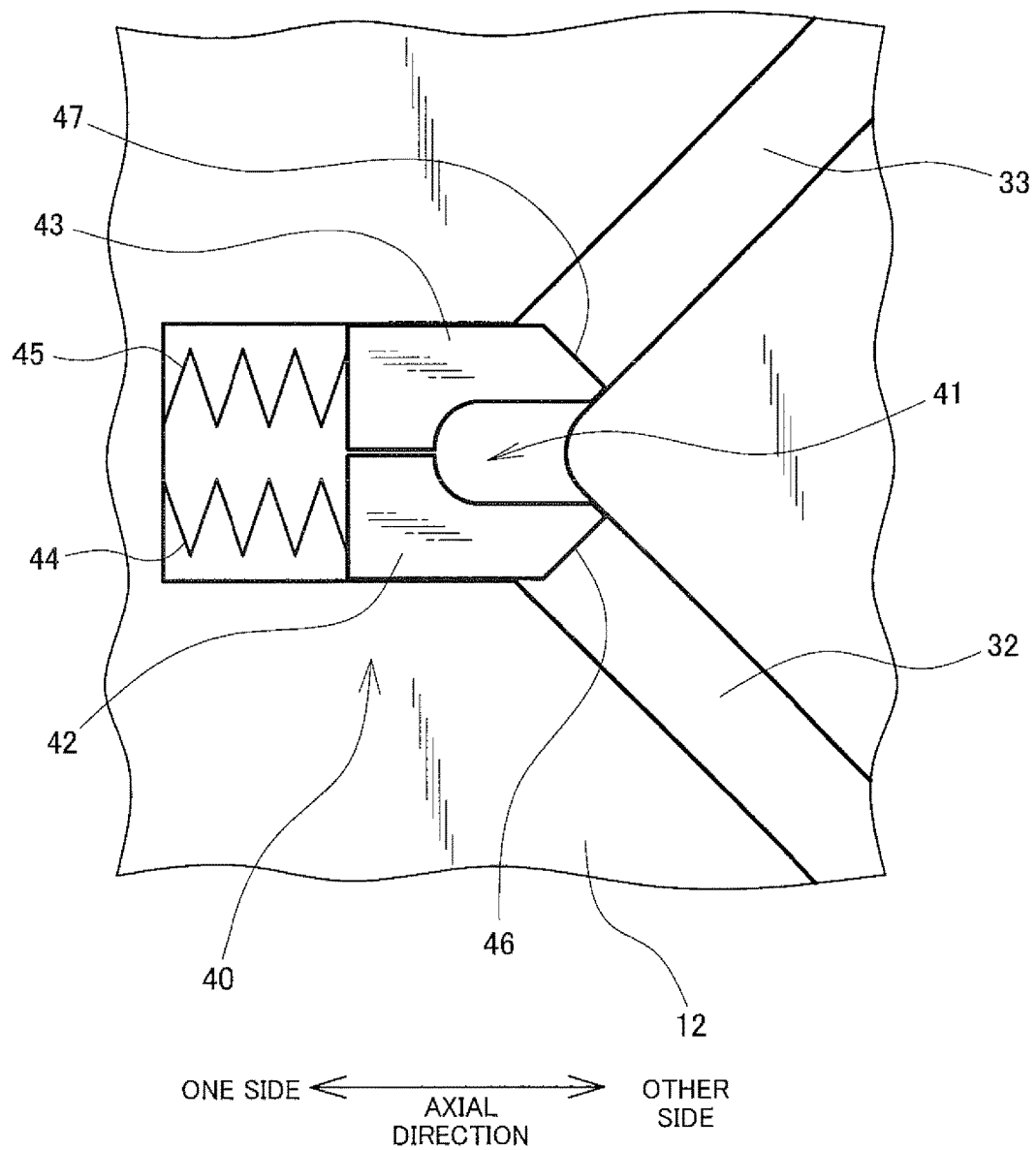
FIG. 8 is a diagram showing a configuration example of a restriction mechanism.

A spring 38 as a load generation mechanism is attached to the second rotating shaft 22. The spring 38 is elastic in the axial direction, and applies, to the sleeve 14, a load in a direction away from the second rotating shaft 22 (a load toward the other side in the axial direction). A restriction mechanism 40 restricts the movement of the supported portions 15 along the supporting flutes 30 when the supported portions 15 of the sleeve 14 fit in the flute joining portions 35 (when the positions of the sleeve 14 that are supported by the supporting flutes 30 are the flute joining portions 35), thereby restricting the movement of the sleeve 14 relative to the first rotating shaft 12. A configuration example of the restriction mechanism 40 is shown in FIG. 8. In the configuration example shown in FIG. 8, restriction members 42 and 43 adjacent in the circumferential direction are supported by the outer circumference of the first rotating shaft 12 via springs 44 and 45, respectively, and are urged toward the other side in the axial direction due to elastic force by the springs 44 and 45, respectively. Cutouts are formed in the restriction members 42 and 43 so that a holding portion 41 for holding the supported portion 15 of the sleeve 14 is formed. Moreover, tapered surfaces 46 and 47 tilted relative to the axial direction are formed in the restriction members 42 and 43, respectively.

Figure 9:
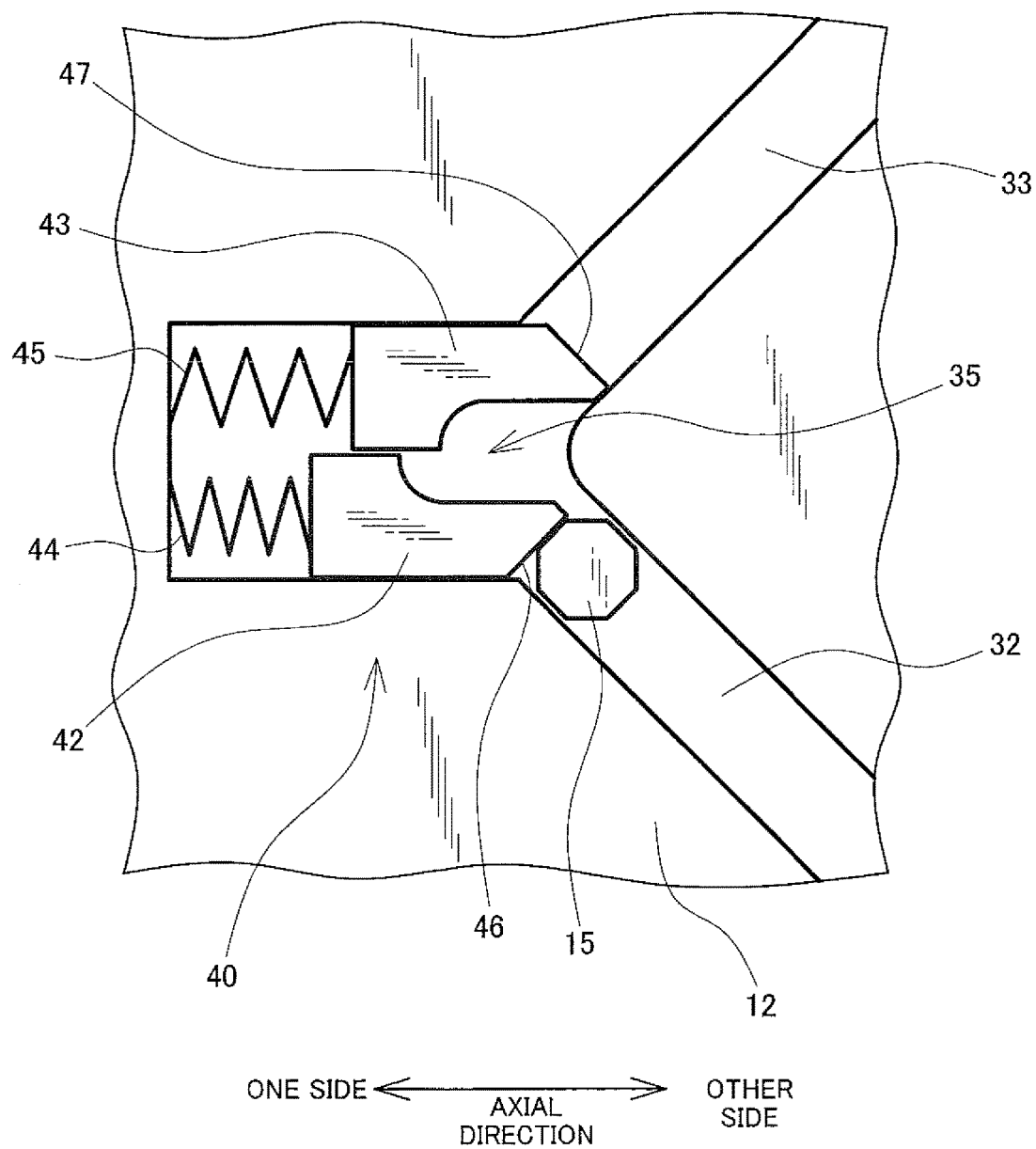
FIG. 9 is a diagram illustrating an operation of the restriction mechanism.
Figure 10:
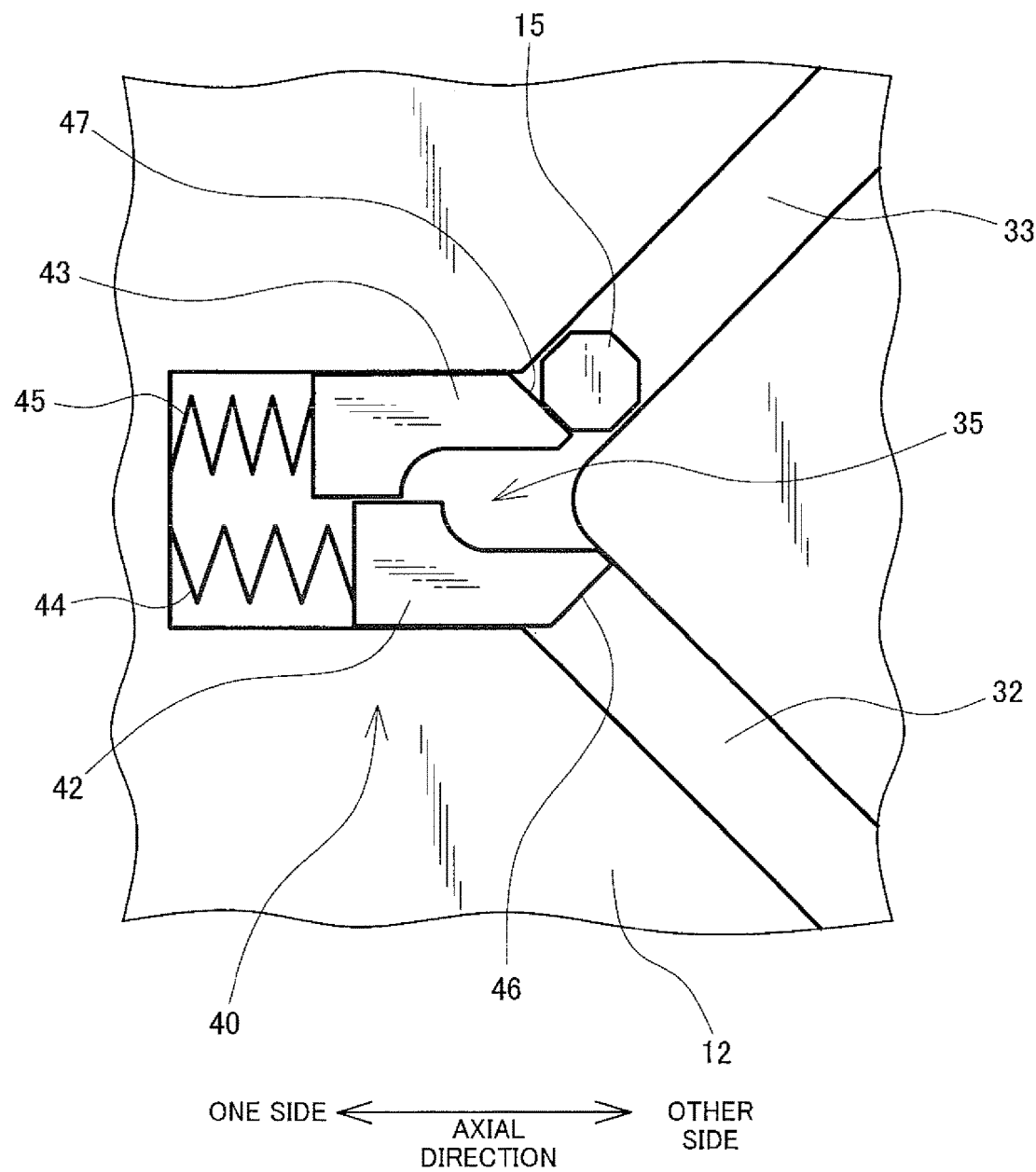
FIG. 10 is a diagram illustrating an operation of the restriction mechanism.
Figure 11:
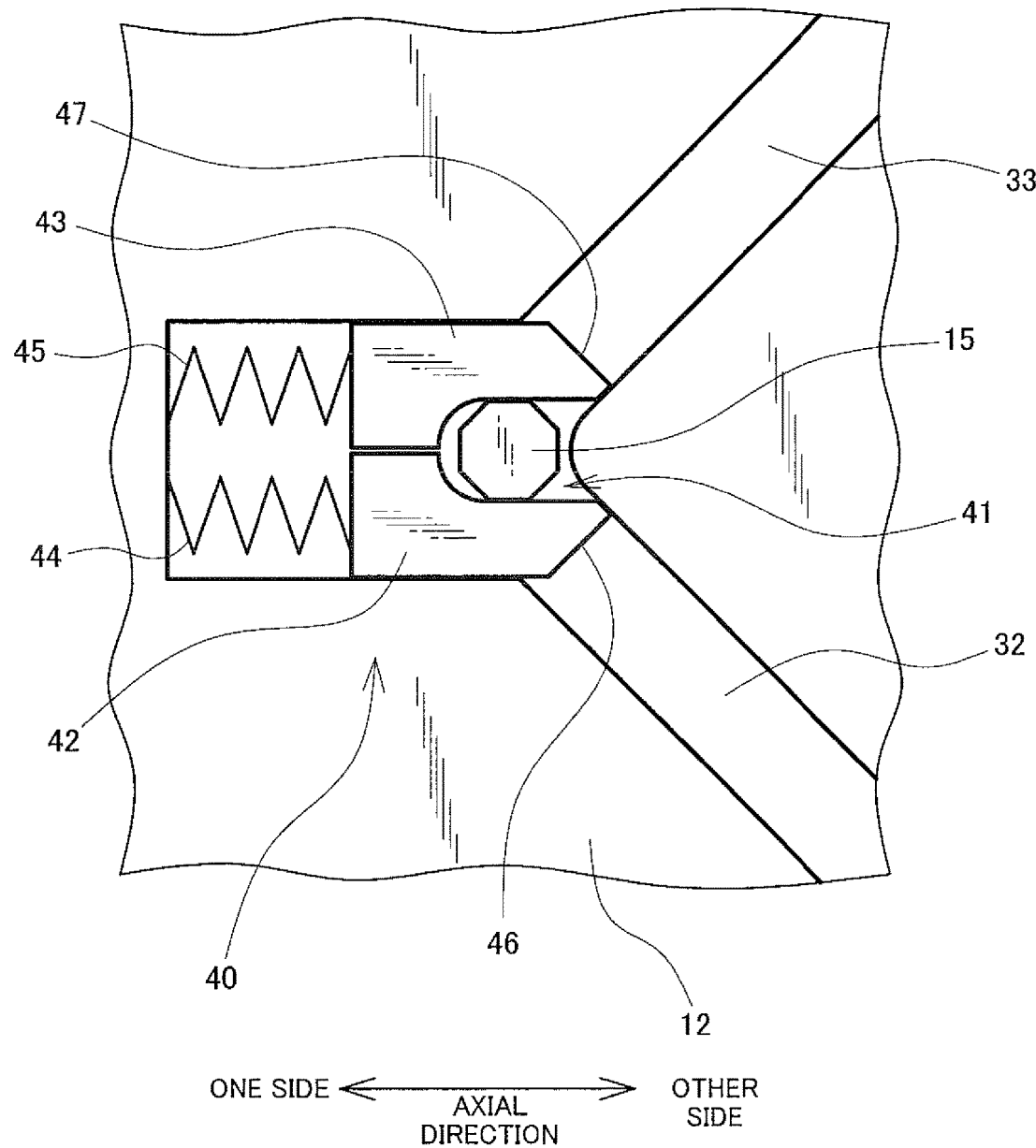
FIG. 11 is a diagram illustrating an operation of the restriction mechanism.

When the restriction members 42 and 43 are urged toward the other side in the axial direction due to elastic force by the springs 44 and 45, the holding portion 41 is located in the flute joining portion 35, the tapered surface 46 of the restriction members 42 faces the right-handed helical flute 32, and the tapered surface 47 of the restriction members 43 faces the left-handed helical flute 33, as shown in FIG. 8. If the supported portions 15 of the sleeve 14 fitting in the right-handed helical flutes 32 move toward the flute joining portions 35, the supported portions 15 press the tapered surfaces 46 of the restriction members 42 as shown in FIG. 9, so that the restriction members 42 move to one side in the axial direction while compressing the springs 44, and the supported portions 15 move to the flute joining portions 35. If the supported portions 15 move to the flute joining portions 35, the compressed springs 44 are restored, so that the restriction members 42 are urged to move to the other side in the axial direction. If the supported portions 15 of the sleeve 14 fitting in the left-handed helical flutes 33 move toward the flute joining portions 35, the supported portions 15 press the tapered surfaces 47 of the restriction members 43 as shown in FIG. 10, so that the restriction members 43 move to one side in the axial direction while compressing the springs 45, and the supported portions 15 move to the flute joining portions 35. If the supported portions 15 move to the flute joining portions 35, the compressed springs 45 are restored, so that the restriction members 43 are urged to move to the other side in the axial direction. Consequently, as shown in FIG. 11, the supported portions 15 of the sleeve 14 are held by the holding portions 41 of the restriction members 42 and 43, and the movement of the sleeve 14 relative to the first rotating shaft 12 is restricted. When the supported portions 15 of the sleeve 14 move toward the flute joining portions 35 from the right-handed helical flutes 32 or the left-handed helical flutes 33, the sleeve 14 moves to one side in the axial direction while compressing the spring 38.

A driving mechanism 52 moves the sleeve 14 to one side in the axial direction so that the supported portions 15 of the sleeve 14 make the transition from fitting in the non-engaging flutes 31 to fitting in the flute branch portions 34.

Figure 12:
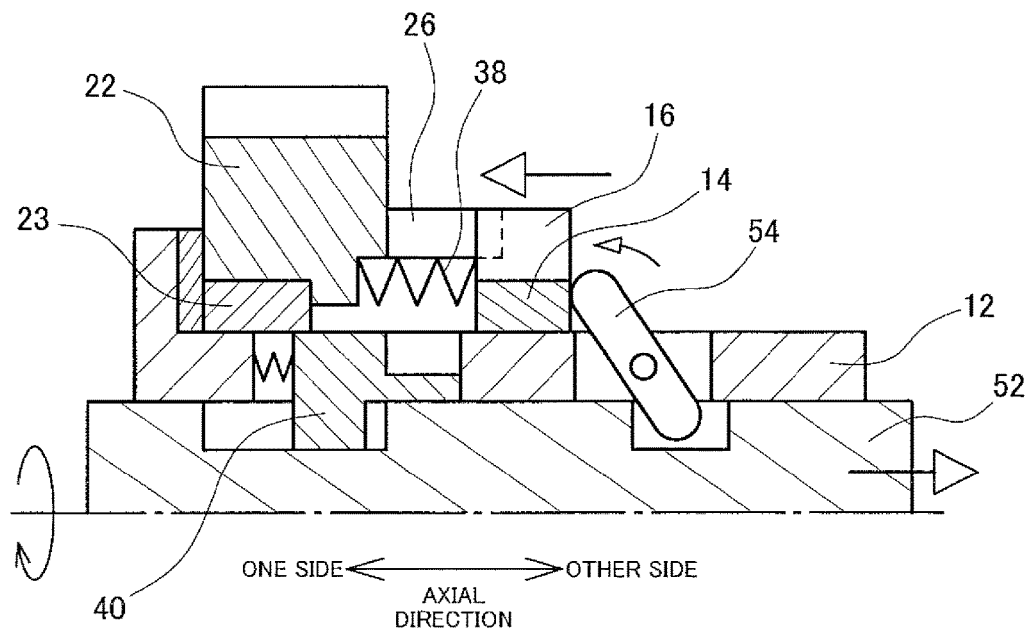
FIG. 12 is a diagram illustrating an operation of the clutch mechanism according to the embodiment of the present invention.

That is, the positions of the sleeve 14 that are supported by the supporting flutes 30 are moved from the non-engaging flutes 31 to the flute branch portions 34. In the configuration example shown in FIGS. 1 and 2, a shift member 52 is provided as the driving mechanism on the inner circumference of the first rotating shaft 12, and the shift member 52 is movable relative to the first rotating shaft 12 in the axial direction. Moreover, the first rotating shaft 12 is provided with a link mechanism 54, and the link mechanism 54 can rotate relative to the first rotating shaft 12 around an axis perpendicular to the axial direction. As shown in FIG. 12, if the shift member 52 is moved to the other side (the right side in FIG. 12) in the axial direction, the link mechanism 54 turns counterclockwise in FIG. 12 to press the sleeve 14 toward one side in the axial direction, so that the sleeve 14 moves to one side in the axial direction while compressing the spring 38, and the supported portions 15 of the sleeve 14 move to the flute branch portions 34 from the non-engaging flutes 31, as shown in FIG. 3 and FIG. 4. Thus, the positions of the sleeve 14 that are supported by the supporting flutes 30 move to the flute branch portions 34 from the non-engaging flutes 31.

Figure 13:
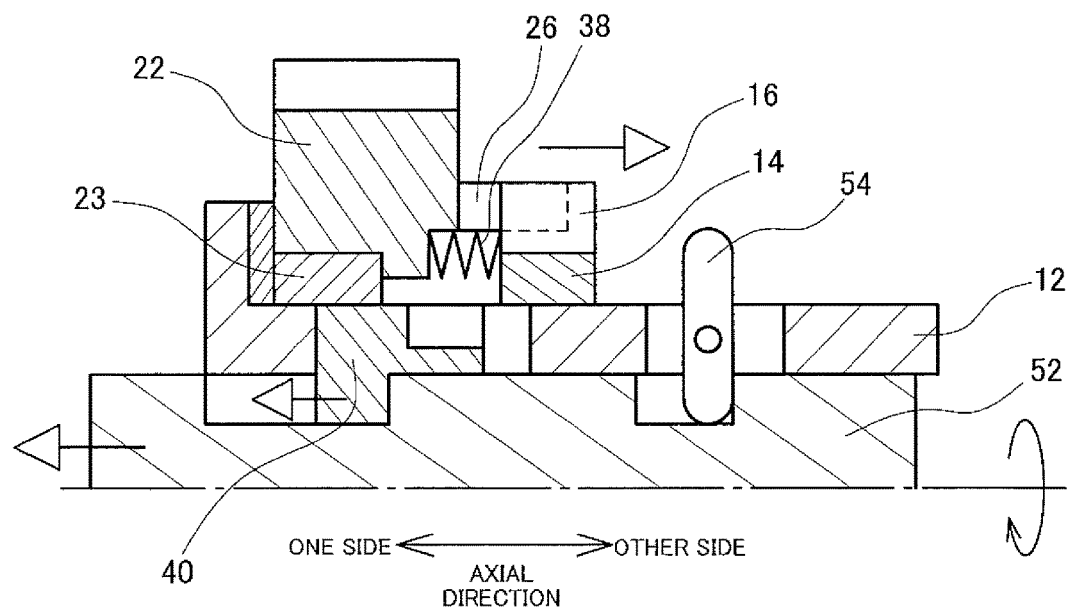
FIG. 13 is a diagram illustrating an operation of the clutch mechanism according to the embodiment of the present invention.
Figure 14:
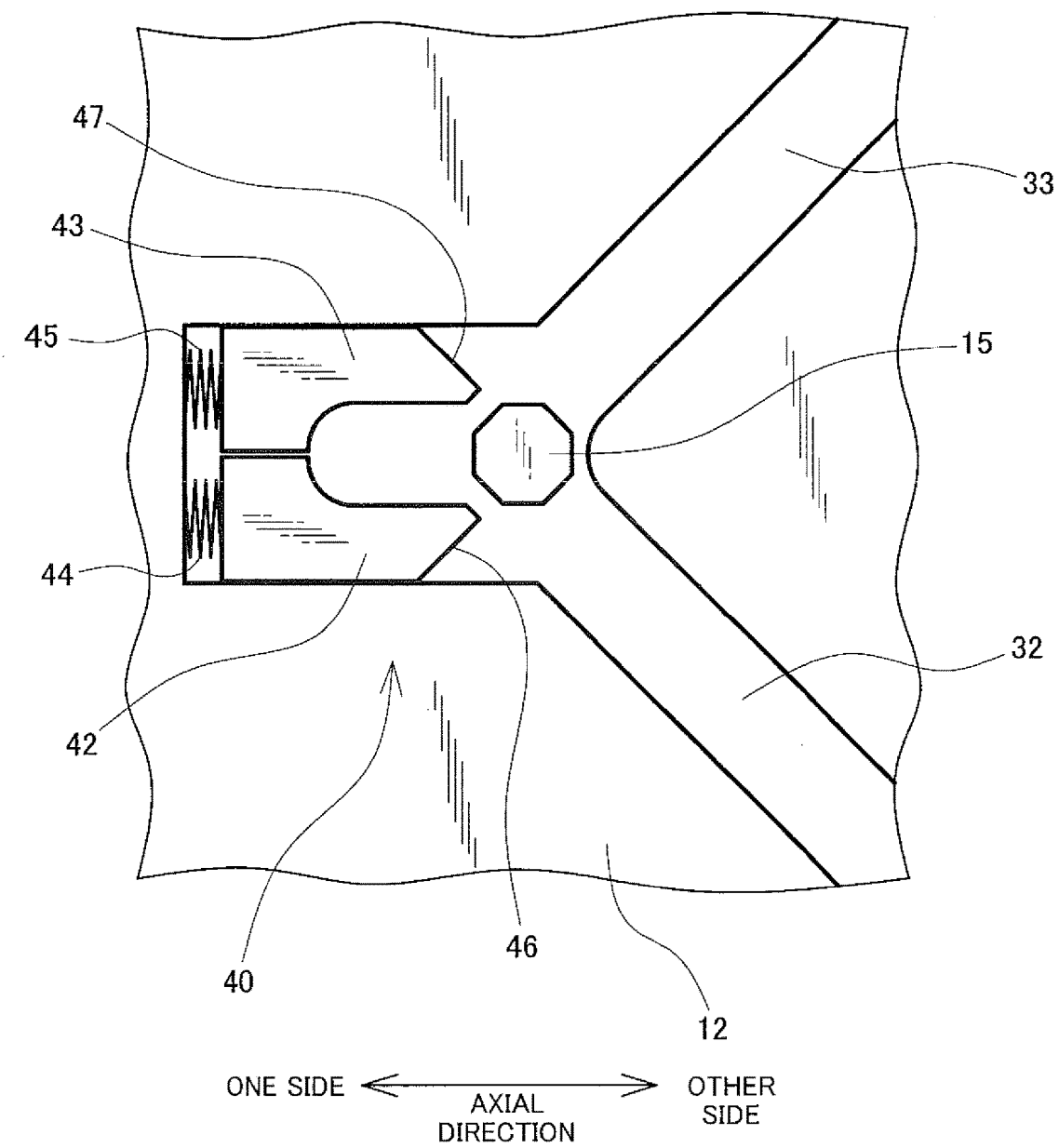
FIG. 14 is a diagram illustrating an operation of the restriction mechanism.

The shift member 52 releases the restriction of the movement of the sleeve 14 relative to the first rotating shaft 12 by the restriction mechanism 40. In the configuration example shown in FIGS. 1 and 2, if the shift member 52 is moved to one side (the left side in FIG. 13) in the axial direction as shown in FIG. 13, the shift member 52 presses the restriction mechanisms 40 (the restriction members 42 and 43) to one side in the axial direction, so that the restriction members 42 and 43 move to one side in the axial direction while compressing the springs 44 and 45, as shown in FIG. 14. As a result, the condition in which the supported portions 15 of the sleeve 14 are held by the holding portions 41 of the restriction members 42 and 43 is released, and the restriction of the movement of the sleeve 14 relative to the first rotating shaft 12 is released. In addition, the driving mechanism 52 can also be driven (the shift member 52 can also be moved in the axial direction) by driving an actuator under electronic control or by the operator's operation.

Next, an operation of the clutch mechanism according to the present embodiment, in particular, an operation to connect/disconnect power between the first rotating shaft 12 and the second rotating shaft 22 is described. In the case described below, power from a driving source such as an engine or a motor is input to the first rotating shaft 12.

As shown in FIG. 3, when the positions of the sleeve 14 that are supported by the supporting flutes 30 are the non-engaging flutes 31 (the supported portions 15 of the sleeve 14 fit in the non-engaging flutes 31), the engaging teeth 16 of the sleeve 14 do not mesh with the engagement teeth 26 of the second rotating shaft 22. In this case, the clutch mechanism is in a released state, and the transmission of power between the first rotating shaft 12 and the second rotating shaft 22 is cut off. If the first rotating shaft 12 rotates in a predetermined direction (a clockwise direction when the first rotating shaft 12 is seen from one side (the left side in FIG. 2) in the axial direction in the example in FIG. 2) by the power from the driving source, the sleeve 14 also rotates together with the first rotating shaft 12 at the same rotation speed.

In order to change the clutch mechanism from the released state to an engaging state to transmit power between the first rotating shaft 12 and the second rotating shaft 22, the shift member 52 is first moved to the other side in the axial direction to press the sleeve 14 to one side in the axial direction by the link mechanism 54, as shown in FIG. 12. The sleeve 14 moves to one side in the axial direction while compressing the spring 38, and if the supported portions 15 of the sleeve 14 move to the flute branch portions 34 from the non-engaging flutes 31 as shown in FIG. 3 and FIG. 4, the engaging teeth 16 of the sleeve 14 start to mesh with the engagement teeth 26 of the second rotating shaft 22, and the sleeve 14 and the second rotating shaft 22 rotate and synchronize, as shown in FIG. 12.

In the case where the rotation speed of the first rotating shaft 12 in the predetermined direction is higher than that of the second rotating shaft 22 when the supported portions 15 of the sleeve 14 have moved to the flute branch portions 34, the supported portions 15 of the sleeve 14 move to the right-handed helical flutes 32 from the flute branch portions 34 and then move to the flute joining portions 35 along the extending direction of the right-handed helical flutes 32, as shown in FIG. 4 and FIG. 5, so that the sleeve 14 relatively moves to one side in the axial direction while rotating relative to the first rotating shaft 12 in a direction reverse to the predetermined direction (the rotation direction of the first rotating shaft 12). Consequently, the sleeve 14 can be moved to one side in the axial direction while the rotation difference between the first rotating shaft 12 and the sleeve 14 is permitted so that the rotation speed of the first rotating shaft 12 in the predetermined direction may be higher than that of the sleeve 14 (the second rotating shaft 22). If the sleeve 14 moves to one side in the axial direction, the ratio of the part in which the engaging teeth 16 of the sleeve 14 mesh with the engagement teeth 26 of the second rotating shaft 22 increases.

Figure 15:
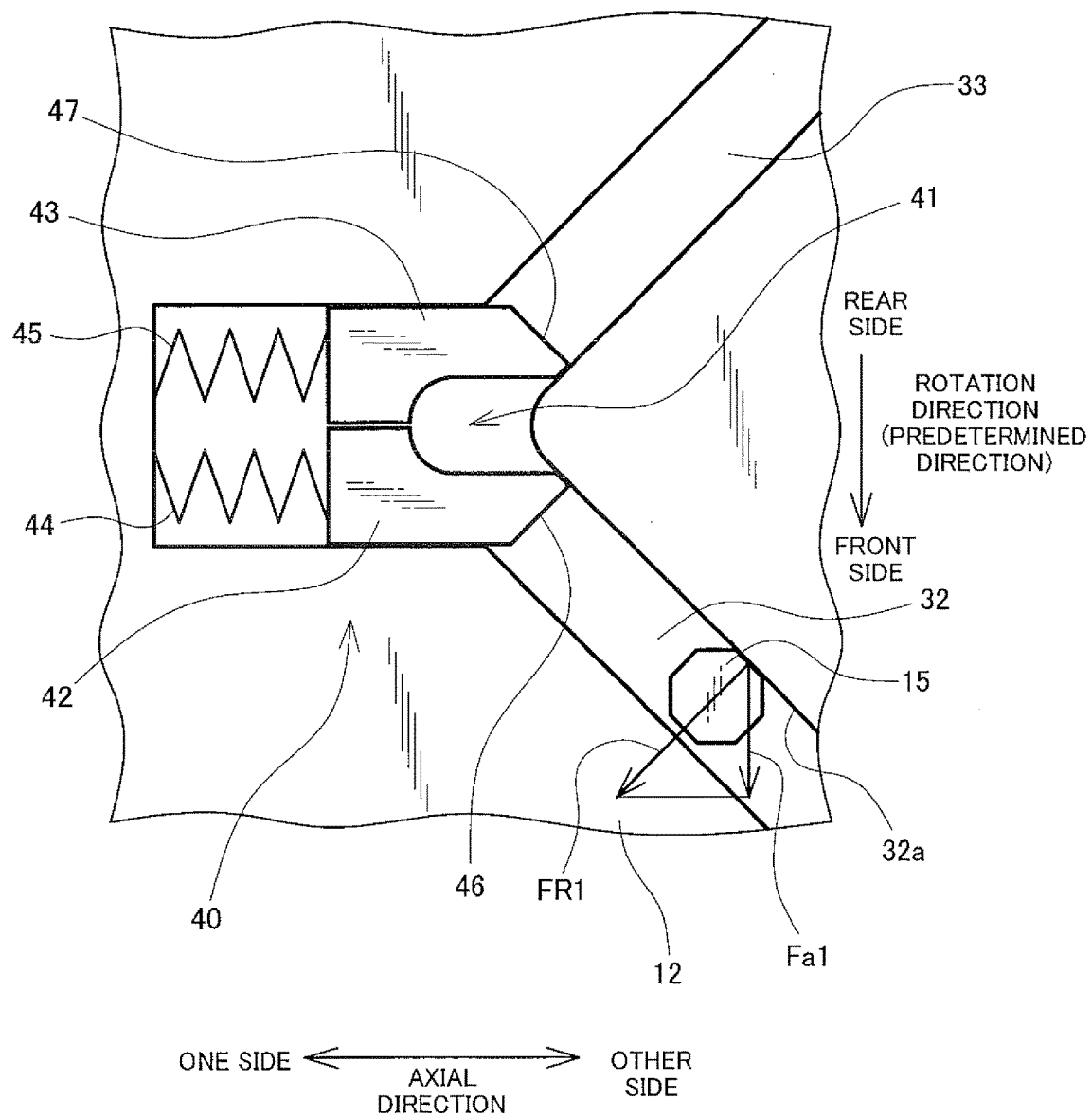
FIG. 15 is a diagram illustrating an operation of the clutch mechanism according to the embodiment of the present invention.

When the supported portions 15 of the sleeve 14 move in the right-handed helical flutes 32 toward the flute joining portions 35, the sleeve 14 moves to one side in the axial direction while pressing the spring 38, and a load toward the other side in the axial direction is applied to the sleeve 14 from the spring 38. The supported portions 15 of the sleeve 14 abut on side surfaces (abutment surfaces) 32a of the right-handed helical flutes 32 on the other side in the axial direction as shown in FIG. 15 due to the load of the spring 38, so that press force (reaction force) FR1 is applied to the supported portions 15 from the side surfaces 32a of the right-handed helical flutes 32, and this press force (reaction force) FR1 is applied to the second rotating shaft 22 via the spring 38. Since the side surfaces 32a of the right-handed helical flutes 32 are tilted toward one side in the axial direction relative to the rotation direction (predetermined direction) of the first rotating shaft 12 from its front side to its rear side, the press force FR1 applied to the supported portions 15 from the side surfaces 32a of the right-handed helical flutes 32 has a component Fa1 in the rotation direction (predetermined direction) of the first rotating shaft 12. Therefore, torque in the predetermined direction is applied to the sleeve 14 by the application of the load toward the other side in the axial direction to the sleeve 14 from the spring 38 attached to the second rotating shaft 22. This torque in the predetermined direction can be used to transmit, to the second rotating shaft 22, part of the power input to the first rotating shaft 12 from the driving source.

If the supported portions 15 of the sleeve 14 which move in the right-handed helical flutes 32 reach the vicinity of the flute joining portions 35, the supported portions 15 press the tapered surfaces 46 of the restriction members 42 as shown in FIG. 9, so that the restriction members 42 move to one side in the axial direction while compressing the springs 44, and the supported portions 15 move to the flute joining portions 35. If the supported portions 15 move to the flute joining portions 35, the compressed springs 44 are restored, so that the restriction members 42 are urged to move to the other side in the axial direction. Consequently, as shown in FIG. 11, the supported portions 15 of the sleeve 14 are held by the holding portions 41 of the restriction members 42 and 43, and the movement of the sleeve 14 relative to the first rotating shaft 12 is restricted.

On the contrary, in the case where the rotation speed of the first rotating shaft 12 in the predetermined direction is lower than that of the second rotating shaft 22 when the supported portions 15 of the sleeve 14 have moved to the flute branch portions 34, the supported portions 15 of the sleeve 14 move to the left-handed helical flutes 33 from the flute branch portions 34 and then move to the flute joining portions 35 along the extending direction of the left-handed helical flutes 33, as shown in FIG. 4 to FIG. 6, so that the sleeve 14 relatively moves to one side in the axial direction while rotating relative to the first rotating shaft 12 in the same direction as the predetermined direction (the rotation direction of the first rotating shaft 12). Consequently, the sleeve 14 can be moved to one side in the axial direction while the rotation difference between the first rotating shaft 12 and the sleeve 14 is permitted so that the rotation speed of the first rotating shaft 12 in the predetermined direction may be lower than that of the sleeve 14 (the second rotating shaft 22).

Figure 16:
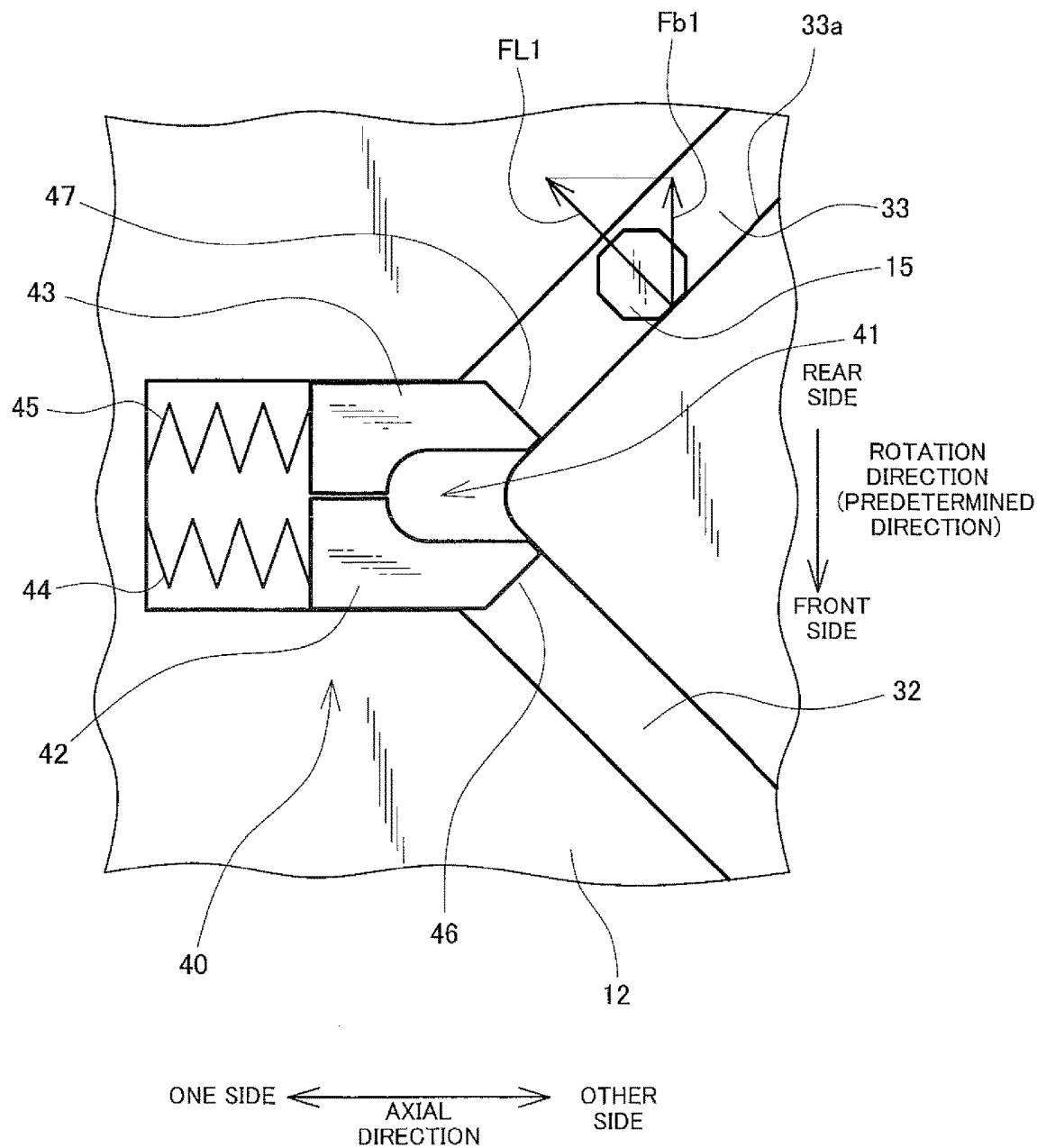
FIG. 16 is a diagram illustrating an operation of the clutch mechanism according to the embodiment of the present invention.

When the supported portions 15 of the sleeve 14 move in the left-handed helical flutes 33 toward the flute joining portions 35 as well, the sleeve 14 moves to one side in the axial direction while pressing the spring 38, and a load toward the other side in the axial direction is applied to the sleeve 14 from the spring 38. The supported portions 15 of the sleeve 14 abut on side surfaces (abutment surfaces) 33a of the left-handed helical flutes 33 on the other side in the axial direction as shown in FIG. 16 due to the load of the spring 38, so that press force (reaction force) FL1 is applied to the supported portions 15 from the side surfaces 33a of the left-handed helical flutes 33, and this press force (reaction force) FL1 is applied to the second rotating shaft 22 via the spring 38. Since the side surfaces 33a of the left-handed helical flutes 33 are tilted toward the other side in the axial direction relative to the rotation direction (predetermined direction) of the first rotating shaft 12 from its front side to its rear side, the press force FL1 applied to the supported portions 15 from the side surfaces 33a of the left-handed helical flutes 33 has a component Fb1 in the direction reverse to the rotation direction (predetermined direction) of the first rotating shaft 12, and torque in the direction reverse to the predetermined direction is applied to the sleeve 14.

If the supported portions 15 of the sleeve 14 which move in the left-handed helical flutes 33 reach the vicinity of the flute joining portions 35, the supported portions 15 press the tapered surfaces 47 of the restriction members 43 as shown in FIG. 10, so that the restriction members 43 move to one side in the axial direction while compressing the springs 45, and the supported portions 15 move to the flute joining portions 35. If the supported portions 15 move to the flute joining portions 35, the compressed springs 45 are restored, so that the restriction members 43 are urged to move to the other side in the axial direction. Consequently, as shown in FIG. 11, the supported portions 15 of the sleeve 14 are held by the holding portions 41 of the restriction members 42 and 43, and the movement of the sleeve 14 relative to the first rotating shaft 12 is restricted.

Figure 17:
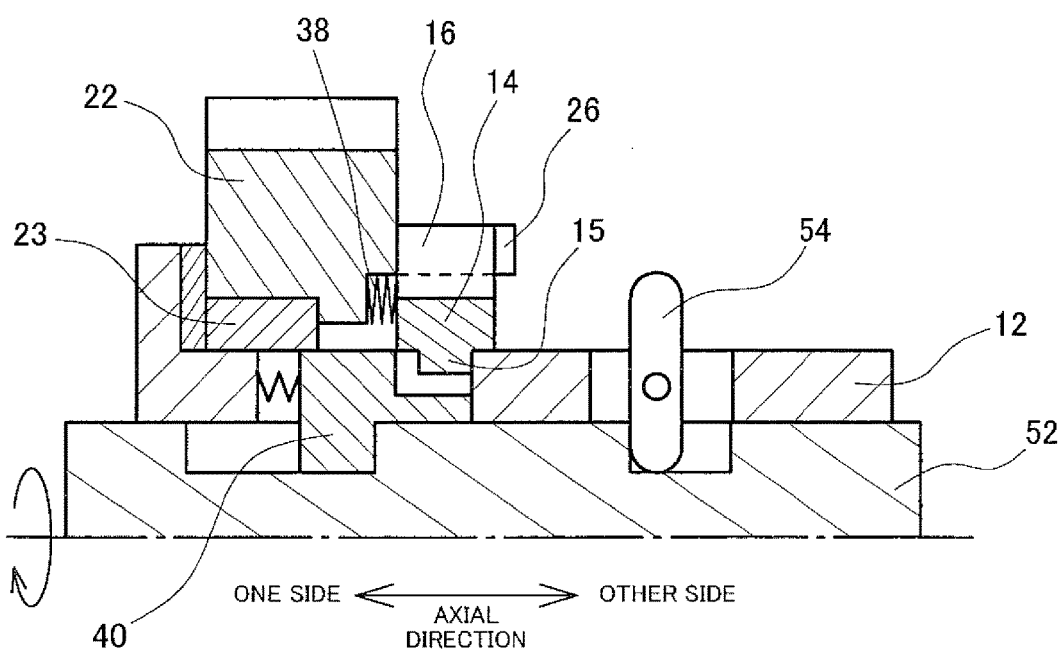
FIG. 17 is a diagram illustrating an operation of the clutch mechanism according to the embodiment of the present invention.

As shown in FIGS. 7 and 11, when the supported portions 15 of the sleeve 14 are held by the holding portions 41 of the restriction members 42 and 43 (located in the flute joining portion 35), the movement of the sleeve 14 relative to the first rotating shaft 12 is restricted, and the engaging teeth 16 of the sleeve 14 completely mesh with the engagement teeth 26 of the second rotating shaft 22 as shown in FIG. 17. In this case, the clutch mechanism is in the engaged state, and the power input to the first rotating shaft 12 from the driving source is transmitted to the second rotating shaft 22.

In order to change the clutch mechanism from the engaged state to the released state to cut off the transmission of power between the first rotating shaft 12 and the second rotating shaft 22, the shift member 52 is first moved to the one side in the axial direction to press the restriction mechanisms 40 (the restriction members 42 and 43) to one side in the axial direction, as shown in FIG. 13. If the restriction members 42 and 43 move to one side in the axial direction while compressing the springs 44 and 45 as shown in FIG. 14, the condition in which the supported portions 15 of the sleeve 14 are held by the holding portions 41 of the restriction members 42 and 43 is released, and the restriction of the movement of the sleeve 14 relative to the first rotating shaft 12 is released.

In the case where the rotation speed of the first rotating shaft 12 in the predetermined direction tends to be lower than that of the second rotating shaft 22 when the restriction of the movement of the sleeve 14 relative to the first rotating shaft 12 is released, the supported portions 15 of the sleeve 14 move to the right-handed helical flutes 32 from the flute joining portions 35 and then move to the flute branch portions 34 along the extending direction of the right-handed helical flutes 32 as shown in FIG. 7 to FIG. 5, so that the sleeve 14 relatively moves to the other side in the axial direction while rotating relative to the first rotating shaft 12 in the same direction as the predetermined direction (the rotation direction of the first rotating shaft 12). Consequently, the sleeve 14 can be moved to the other side in the axial direction while the rotation difference between the first rotating shaft 12 and the sleeve 14 is permitted so that the rotation speed of the first rotating shaft 12 in the predetermined direction may be lower than that of the sleeve 14 (the second rotating shaft 22). If the sleeve 14 moves to the other side in the axial direction, the extent to which the engaging teeth 16 of the sleeve 14 mesh with the engagement teeth 26 of the second rotating shaft 22 decreases.

When the supported portions 15 of the sleeve 14 move in the right-handed helical flutes 32 toward the flute branch portions 34, a load toward the other side in the axial direction is applied to the sleeve 14 from the compressed spring 38. The supported portions 15 of the sleeve 14 abut on the side surfaces 32a of the right-handed helical flutes 32 on the other side in the axial direction as shown in FIG. 15 due to the load of the spring 38, so that the press force (reaction force) FR1 is applied to the supported portions 15 from the side surfaces 32a of the right-handed helical flutes 32, and this press force (reaction force) FR1 is applied to the second rotating shaft 22 via the spring 38. The press force FR1 applied to the supported portions 15 from the side surfaces 32a of the right-handed helical flutes 32 has a component Fa1 in the rotation direction (predetermined direction) of the first rotating shaft 12, and torque in the predetermined direction is applied to the sleeve 14. This torque in the predetermined direction can be used to transmit, to the second rotating shaft 22, part of the power of the first rotating shaft 12.

On the contrary, in the case where the rotation speed of the first rotating shaft 12 in the predetermined direction tends to be higher than that of the second rotating shaft 22 when the restriction of the movement of the sleeve 14 relative to the first rotating shaft 12 is released, the supported portions 15 of the sleeve 14 move to the left-handed helical flutes 33 from the flute joining portions 35 and then move to the flute branch portions 34 along the extending direction of the left-handed helical flutes 33 as shown in FIG. 7 to FIG. 6, so that the sleeve 14 relatively moves to the other side in the axial direction while rotating relative to the first rotating shaft 12 in the direction reverse to the predetermined direction (the rotation direction of the first rotating shaft 12). Consequently, the sleeve 14 can be moved to the other side in the axial direction while the rotation difference between the first rotating shaft 12 and the sleeve 14 is permitted so that the rotation speed of the first rotating shaft 12 in the predetermined direction may be higher than that of the sleeve 14 (the second rotating shaft 22).

When the supported portions 15 of the sleeve 14 move in the left-handed helical flutes 33 toward the flute branch portions 34, a load toward the other side in the axial direction is applied to the sleeve 14 from the compressed spring 38. The supported portions 15 of the sleeve 14 abut on the side surfaces 33a of the left-handed helical flutes 33 on the other side in the axial direction as shown in FIG. 16 due to the load of the spring 38, so that the press force (reaction force) FL1 is applied to the supported portions 15 from the side surfaces 33a of the left-handed helical flutes 33, and this press force (reaction force) FL1 is applied to the second rotating shaft 22 via the spring 38. The press force FL1 applied to the supported portions 15 from the side surfaces 33a of the left-handed helical flutes 33 has the component Fb1 in the direction reverse to the rotation direction (predetermined direction) of the first rotating shaft 12, and torque in the direction reverse to the predetermined direction is applied to the sleeve 14.

If the supported portions 15 of the sleeve 14 which have moved in the right-handed helical flutes 32 or the left-handed helical flutes 33 reach the flute branch portions 34, a load toward the other side in the axial direction is applied to the sleeve 14 from the compressed spring 38. Thus, the supported portions 15 of the sleeve 14 move from the flute branch portions 34 to the non-engaging flutes 31 toward the other side in the axial direction as shown in FIG. 4 to FIG. 3, so that the engaging teeth 16 of the sleeve 14 do not mesh with the engagement teeth 26 of the second rotating shaft 22 as shown in FIG. 2. In this case, the clutch mechanism is in a released state, and the transmission of power between the first rotating shaft 12 and the second rotating shaft 22 is cut off.

According to the present embodiment described above, under the condition that the rotation speed of the first rotating shaft 12 in the predetermined direction is higher than that of the second rotating shaft 22, the supported portions 15 of the sleeve 14 move to the flute joining portions 35 from the flute branch portions 34 via the right-handed helical flutes 32, so that an engaging operation of the clutch mechanism (an operation for moving the engaging teeth 16 of the sleeve 14 to one side in the axial direction into mesh with the engagement teeth 26 of the second rotating shaft 22) can be performed. In contrast, under the condition that the rotation speed of the first rotating shaft 12 in the predetermined direction is lower than that of the second rotating shaft 22, the supported portions 15 of the sleeve 14 move to the flute joining portions 35 from the flute branch portions 34 via the left-handed helical flutes 33, so that the engaging operation of the clutch mechanism can be performed. In a releasing operation of the clutch mechanism (an operation for moving the engaging teeth 16 of the sleeve 14 to the other side in the axial direction out of mesh with the engagement teeth 26 of the second rotating shaft 22), the supported portions 15 of the sleeve 14 move to the flute branch portions 34 from the flute joining portions 35 via the right-handed helical flutes 32, so that the clutch mechanism can be released under the condition that the rotation speed of the first rotating shaft 12 in the predetermined direction is lower than that of the second rotating shaft 22. In contrast, in the releasing operation of the clutch mechanism, the supported portions 15 of the sleeve 14 move to the flute branch portions 34 from the flute joining portions 35 via the left-handed helical flutes 33, so that the clutch mechanism can be released under the condition that the rotation speed of the first rotating shaft 12 in the predetermined direction is higher than that of the second rotating shaft 22. Therefore, the engaging operation and the releasing operation of the clutch mechanism can be performed regardless of the condition of rotation speeds of the first rotating shaft 12 and the second rotating shaft 22, and power can be connected/disconnected between the first rotating shaft 12 and the second rotating shaft 22.

Furthermore, when the supported portions 15 of the sleeve 14 are located in the flute joining portions 35 and when the engaging teeth 16 of the sleeve 14 completely mesh with the engagement teeth 26 of the second rotating shaft 22, the movement of the sleeve 14 relative to the first rotating shaft 12 is restricted by the restriction mechanism 40. Therefore, no external power is needed to maintain the engaged state of the clutch mechanism (the engaged state of the first rotating shaft 12 and the second rotating shaft 22). Even when the supported portions 15 of the sleeve 14 are located in the non-engaging flutes 31 and when the engaging teeth 16 of the sleeve 14 do not mesh with the engagement teeth 26 of the second rotating shaft 22, no external power is needed to maintain the released state of the first rotating shaft 12 and the second rotating shaft 22.

When the supported portions 15 of the sleeve 14 move in the right-handed helical flutes 32 or the left-handed helical flutes 33, the supported portions 15 abut on the side surfaces 32a of the right-handed helical flutes 32 or the side surfaces 33a of the left-handed helical flutes 33 due to the load toward the other side in the axial direction applied to the sleeve 14 from the compressed spring 38, torque is applied to the sleeve 14. Owing to this torque, part of the power can be transmitted between the first rotating shaft 12 and the second rotating shaft 22 during the switching of the engage state and the released state of the clutch mechanism, and a shock caused at the time of the switching of the engage state and the released state of the clutch mechanism can be reduced.

In the clutch mechanism described above, it is also possible to attach, to the sleeve 14, the spring 38 for applying the load in the direction away from the second rotating shaft 22 to the sleeve 14. It is also possible to provide a damper instead of the spring 38 to apply the load in the direction away from the second rotating shaft 22 to the sleeve 14.

In the clutch mechanism described above, the power input to the first rotating shaft 12 from the driving source is transmitted to the second rotating shaft 22 by the engagement of the clutch mechanism. However, it is also possible to transmit, to the first rotating shaft 12, the power input to the second rotating shaft 22 from the driving source by the engagement of the clutch mechanism.

Figure 18:
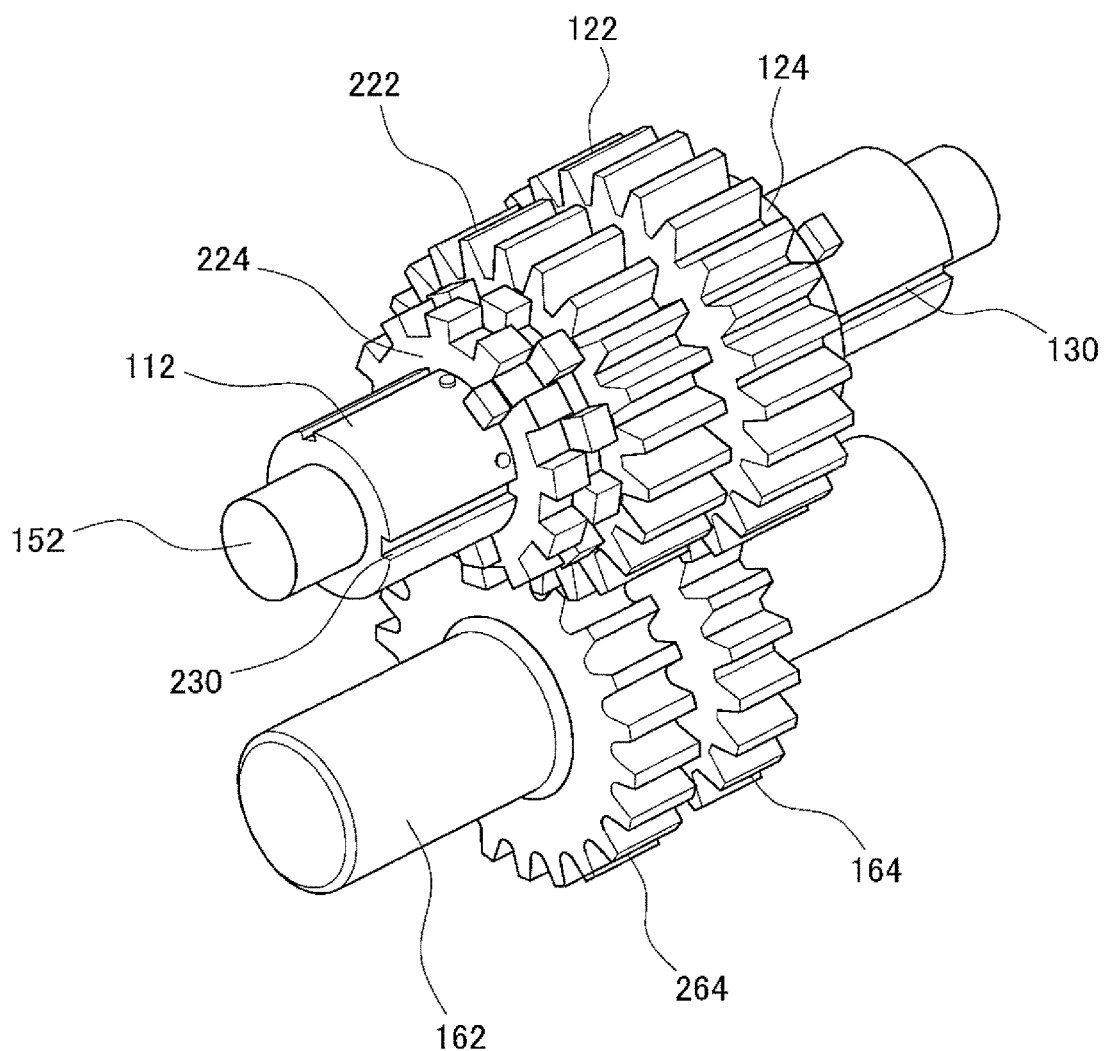
FIG. 18 is a diagram showing a schematic configuration of a transmission according to the embodiment of the present invention.
Figure 19:
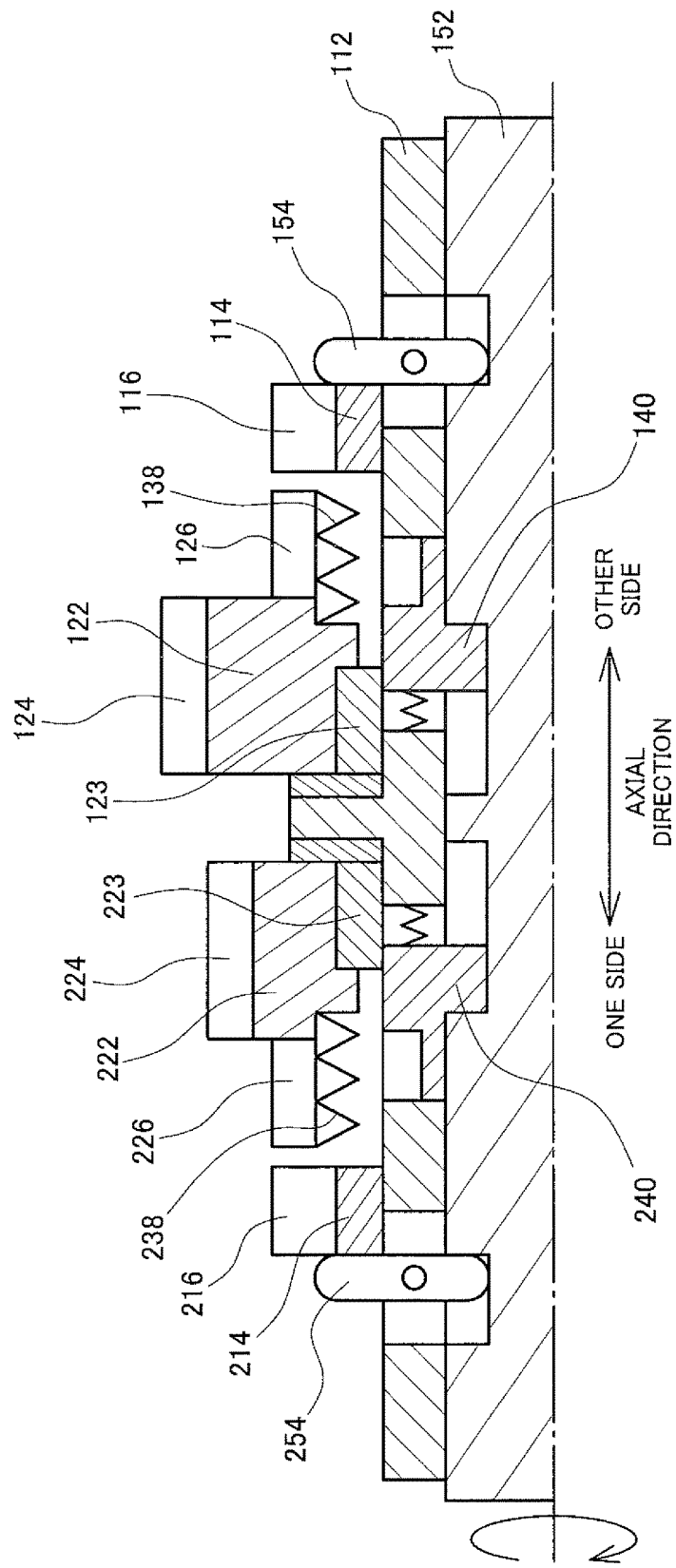
FIG. 19 is a diagram showing a schematic configuration of the transmission according to the embodiment of the present invention.
Figure 20:
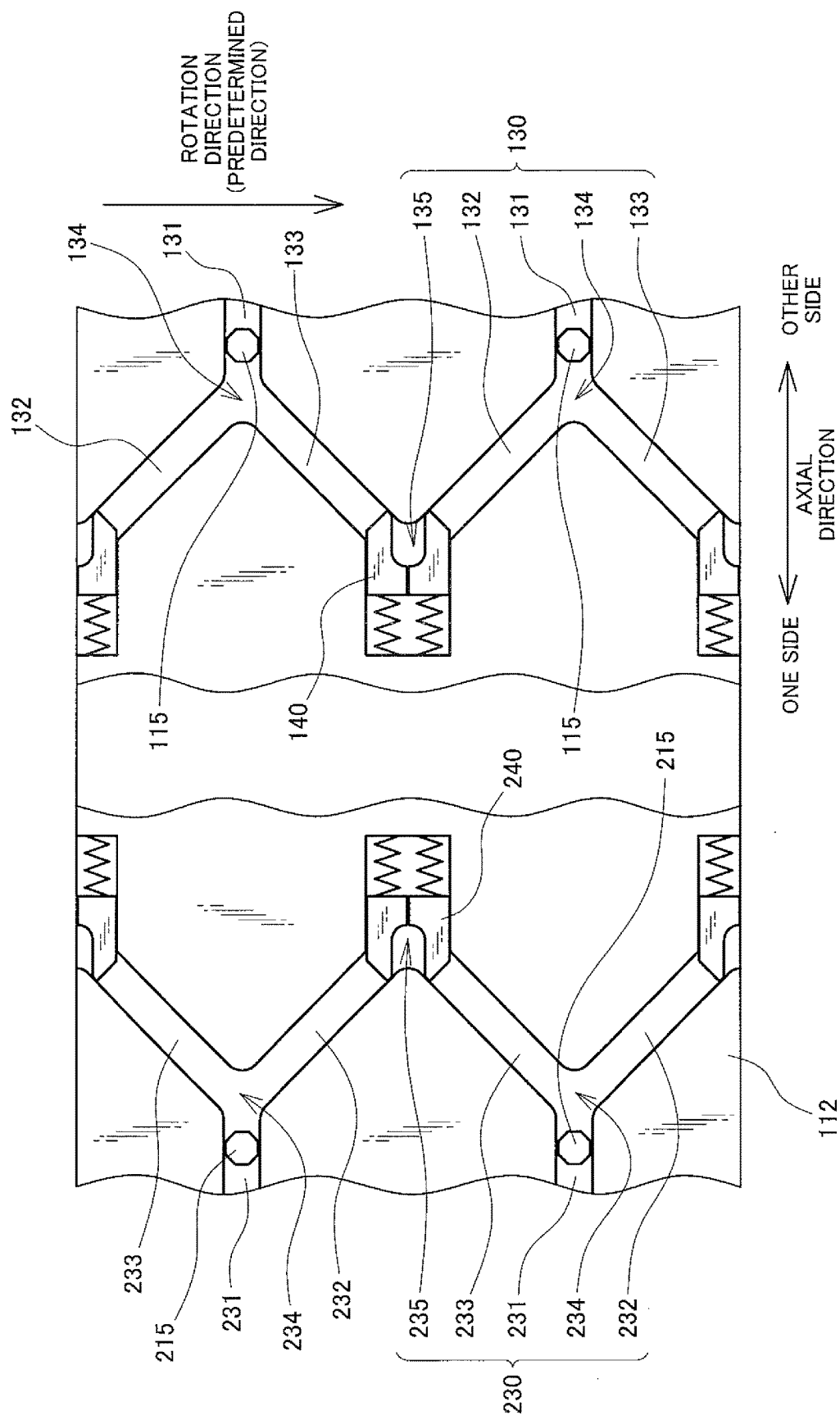
FIG. 20 is a diagram showing a schematic configuration of the transmission according to the embodiment of the present invention.

It is also possible to apply the clutch mechanism according to the present embodiment to a transmission. A configuration example of the transmission comprising the clutch mechanism according to the present embodiment is shown in FIGS. 18 to 20. FIG. 18 shows a perspective view of the primary configuration. FIG. 19 shows a sectional view of the primary configuration seen from a direction that intersects at right angles with the axial direction of a first rotating shaft 112. FIG. 20 shows an expansion plan in which the outer circumferential surface of the first rotating shaft 112 is expanded along the circumferential direction. In the outer circumference of the first rotating shaft 112 as a first rotation member, there are formed a first supporting flute 130 for supporting a first sleeve 114 as a first movable member, and a second supporting flute 230 for supporting a second sleeve 214 as a second movable member. The second supporting flute 230 is disposed closer to one side in the axial direction than the first supporting flute 130.

A plurality of supported portions (first supported portions) 115 are provided with spaces left between one another (at equal intervals) in the circumferential direction on the inner circumference of the first sleeve 114. When each of the supported portions 115 fits into the first supporting flute 130 of the first rotating shaft 112, the first sleeve 114 is supported by the first rotating shaft 112. Each of the supported portions 115 of the first sleeve 114 is movable along the extending direction of the first supporting flute 130, so that the first sleeve 114 can move relative to the first rotating shaft 112 along the first supporting flute 130. Moreover, on the outer circumference of the first sleeve 114, a plurality of engaging teeth (first engaging teeth) 116 are provided with spaces left between one another (at equal intervals) in the circumferential direction.

Similarly, a plurality of supported portions (second supported portions) 215 are provided with spaces left between one another (at equal intervals) in the circumferential direction on the inner circumference of the second sleeve 214. When each of the supported portions 215 fits into the second supporting flute 230 of the first rotating shaft 112, the second sleeve 214 is supported by the first rotating shaft 112. Each of the supported portions 215 of the first sleeve 114 is movable along the extending direction of the second supporting flute 230, so that the second sleeve 214 can move relative to the first rotating shaft 112 along the second supporting flutes 230. Moreover, on the outer circumference of the second sleeve 214, a plurality of engaging teeth (second engaging teeth) 216 are provided with spaces left between one another (at equal intervals) in the circumferential direction.

A first gear member 122 is disposed coaxially with the first rotating shaft 112, and is rotatably supported by the first rotating shaft 112 via a bearing 123. The first gear member 122 is disposed closer to one side than the first sleeve 114 in the axial direction. The first gear member 122 has a first gear 124 on its outer circumferential portion. Moreover, on the end face of the first gear member 122 on the other side in the axial direction, a plurality of engagement teeth (first engagement teeth) 126 are provided with spaces left between one another (at intervals equal to those of the engaging teeth 116) in the circumferential direction. The engaging teeth 116 of the first sleeve 114 are arranged to face the engagement teeth 126 of the first gear member 122 in the axial direction, and can mesh (engage) with the engagement teeth 126 of the first gear member 122.

A second gear member 222 is also disposed coaxially with the first rotating shaft 112, and is rotatably supported by the first rotating shaft 112 via a bearing 223. The second gear member 222 is disposed closer to the other side than the first sleeve 114 and closer to one side than the first gear member 122 in the axial direction. The second gear member 222 has a second gear 224 on its outer circumferential portion. Moreover, on the end face of the first gear member 122 on the other side in the axial direction, a plurality of engagement teeth (second engagement teeth) 226 are provided with spaces left between one another (at intervals equal to those of the engaging teeth 216) in the circumferential direction. The engaging teeth 216 of the second sleeve 214 are arranged to face the engagement teeth 226 of the second gear member 222 in the axial direction, and can mesh (engage) with the engagement teeth 226 of the second gear member 222.

A third gear 164 and a fourth gear 264 are fixed to a second rotating shaft 162 as a second rotation member, and the second rotating shaft 162 rotates together with the third gear 164 and the fourth gear 264. The third gear 164 engages with the first gear 124, and the fourth gear 264 engages with the second gear 224. The gear ratio between the first gear 124 and the third gear 164 is different from the gear ratio between the second gear 224 and the fourth gear 264. In the example shown in FIGS. 18 and 19, the gear ratio (the number of teeth of the first gear/the number of teeth of the third gear) from the third gear 164 to the first gear 124 is higher than the gear ratio (the number of teeth of the second gear/the number of teeth of the fourth gear) from the fourth gear 264 to the second gear 224.

As shown in the expansion plan in FIG. 20, the first supporting flute 130 has a first non-engaging flute 131 extending along the axial direction, a first right-handed helical flute 132 and a first left-handed helical flute 133 located closer to one side (the first gear member 122 side) than the first non-engaging flute 131 in the axial direction, a first flute branch portion 134 which branches into the first right-handed helical flute 132 and the first left-handed helical flute 133 from the first non-engaging flute 131, and a first flute joining portion 135 which is located closer to one side (the first gear member 122 side) than the first flute branch portion 134 in the axial direction and in which the first right-handed helical flute 132 and the first left-handed helical flute 133 join. Similarly, the second supporting flute 230 has a second non-engaging flute 231 extending along the axial direction, a second right-handed helical flute 232 and a second left-handed helical flute 233 located closer to the other side (the second gear member 222 side) than the second non-engaging flute 231 in the axial direction, a second flute branch portion 234 which branches into the second right-handed helical flute 232 and the second left-handed helical flute 233 from the second non-engaging flute 231, and a second flute joining portion 235 which is located closer to the other side (the second gear member 222 side) than the second flute branch portion 234 in the axial direction and in which the second right-handed helical flute 232 and the second left-handed helical flute 233 join. Specific configuration examples of the first supporting flute 130 (the first non-engaging flute 131, the first flute branch portion 134, the first right-handed helical flute 132, the first left-handed helical flute 133, and the first flute joining portion 135) and the second supporting flute 230 (the second non-engaging flute 231, the second flute branch portion 234, the second right-handed helical flute 232, the second left-handed helical flute 233, and the second flute joining portion 235) are similar to the supporting flute 30 (the non-engaging flute 31, the flute branch portion 34, the right-handed helical flute 32, the left-handed helical flute 33, and the flute joining portion 35) described in connection with the clutch mechanism in FIGS. 3 to 7.

A first spring 138 as a first load generation mechanism is attached to the first gear member 122. The first spring 138 is elastic in the axial direction, and applies, to the first sleeve 114, a load in a direction away from the first gear member 122 (a load toward the other side in the axial direction). A second spring 238 as a second load generation mechanism is attached to the second gear member 222. The second spring 238 is elastic in the axial direction, and applies, to the second sleeve 214, a load in a direction away from the second gear member 222 (a load toward one side in the axial direction).

A first restriction mechanism 140 restricts the movement of the supported portions 115 along the first supporting flute 130 when the supported portions 115 of the first sleeve 114 fit in the first flute joining portions 135, thereby restricting the movement of the first sleeve 114 relative to the first rotating shaft 112. A second restriction mechanism 240 restricts the movement of the supported portions 215 along the second supporting flutes 230 when the supported portions 215 of the second sleeve 214 fit in the second flute joining portions 235, thereby restricting the movement of the second sleeve 214 relative to the first rotating shaft 112. Specific configuration examples of the first and second restriction mechanisms 140 and 240 are similar to that of the restriction mechanism 40 (the restriction members 42 and 43 and the springs 44 and 45) described in connection with the clutch mechanism in FIGS. 8 to 11 and 14.

Figure 21:
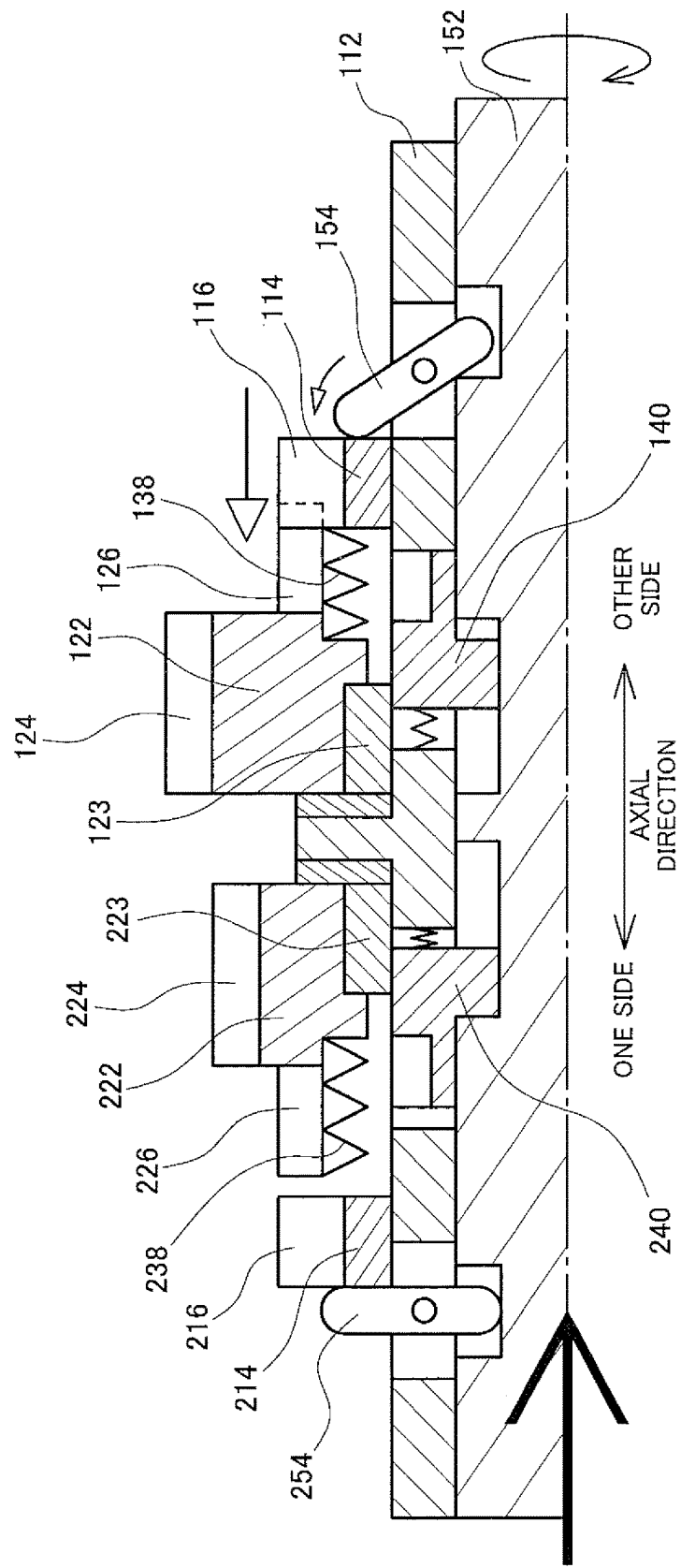
FIG. 21 is a diagram illustrating an operation of the transmission according to the embodiment of the present invention.
Figure 22:
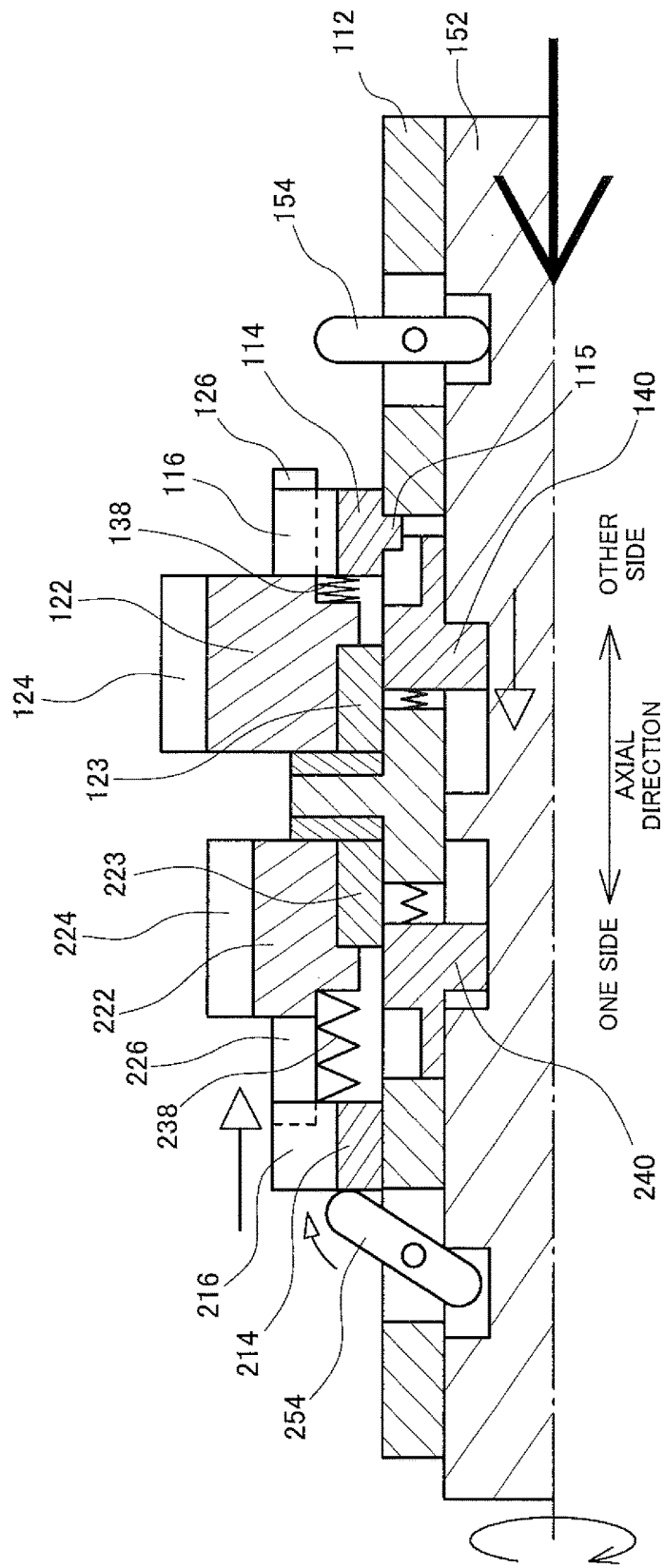
FIG. 22 is a diagram illustrating an operation of the transmission according to the embodiment of the present invention.

A driving mechanism 152 can move the support positions of the first sleeve 114 by the first supporting flutes 130 to the first flute branch portions 134 from the first non-engaging flutes 131. The driving mechanism 152 can also move the support positions of the second sleeve 214 by the second supporting flutes 230 to the second flute branch portions 234 from the second non-engaging flutes 231. In the example shown in FIGS. 18 and 19, a shift member 152 as the driving mechanism is provided on the inner circumference of the first rotating shaft 112, and the shift member 152 is movable relative to the first rotating shaft 112 in the axial direction. Moreover, the first rotating shaft 112 is provided with first and second link mechanisms 154 and 254, and the first and second link mechanisms 154 and 254 can rotate relative to the first rotating shaft 112 around an axis perpendicular to the axial direction. As shown in FIG. 21, if the shift member 152 is moved to the other side in the axial direction, the first link mechanism 154 turns counterclockwise in FIG. 21 to press the first sleeve 114 toward one side in the axial direction, so that the first sleeve 114 moves to one side in the axial direction while compressing the spring 138, and the supported portions 115 of the first sleeve 114 move to the first flute branch portions 134 from the first non-engaging flutes 131. On the other hand, as shown in FIG. 22, if the shift member 152 is moved to one side in the axial direction, the second link mechanism 254 turns clockwise in FIG. 22 to press the second sleeve 214 toward the other side in the axial direction, so that the second sleeve 214 moves to the other side in the axial direction while compressing the second spring 238, and the supported portions 215 of the second sleeve 214 move to the second flute branch portion 234 from the second non-engaging flute 231.

Figure 23:
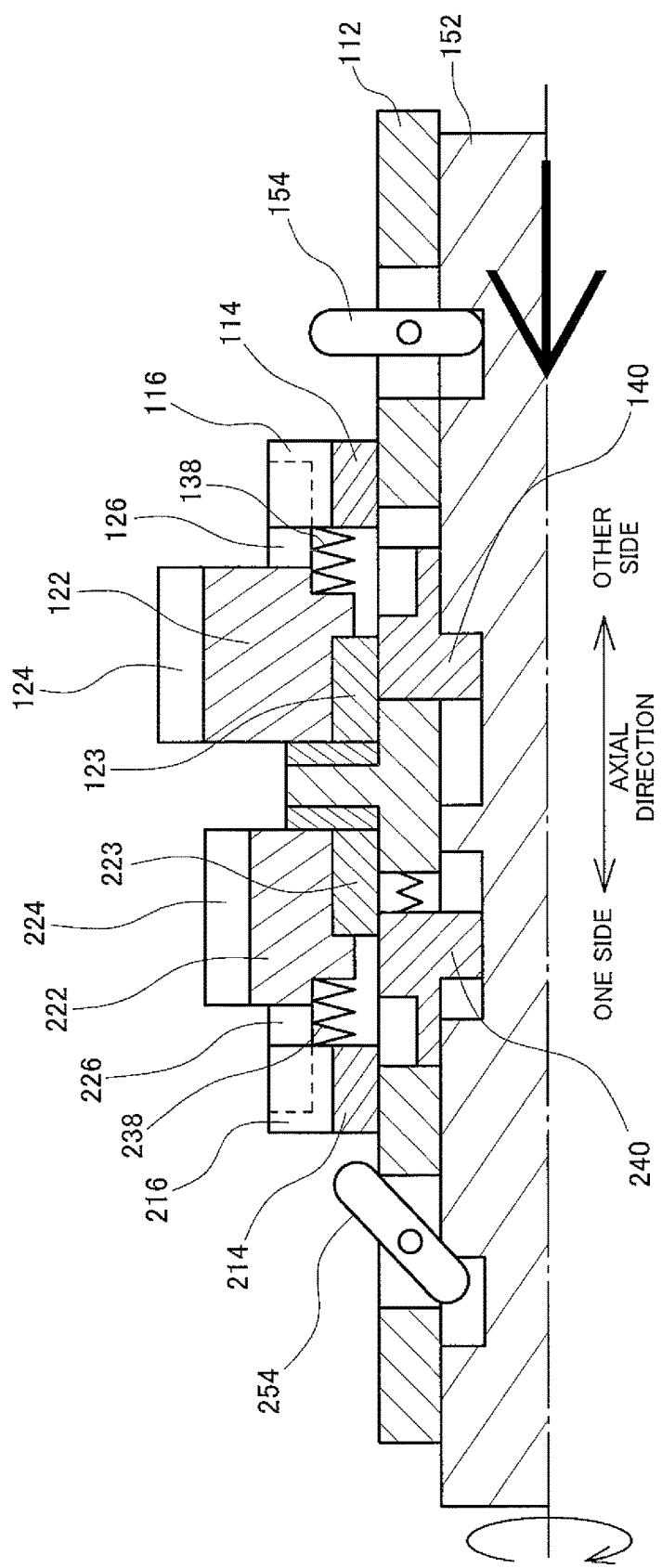
FIG. 23 is a diagram illustrating an operation of the transmission according to the embodiment of the present invention.

The shift member 152 can release the restriction of the movement of the first sleeve 114 relative to the first rotating shaft 112 by the first restriction mechanism 140. The shift member 152 can also release the restriction of the movement of the second sleeve 214 relative to the first rotating shaft 112 by the second restriction mechanism 240. In the configuration example shown in FIGS. 18 and 19, if the shift member 152 is moved to one side in the axial direction to press the first restriction mechanism 140 to one side in the axial direction as shown in FIG. 23, the first restriction mechanism 140 moves to one side in the axial direction so that the restriction of the movement of the first sleeve 114 relative to the first rotating shaft 112 is released, as in the restriction mechanism 40 described in connection with the clutch mechanism in FIGS. 8 to 11 and 14. If the shift member 152 is moved to the other side in the axial direction to press the second restriction mechanism 240 to the other side in the axial direction, the second restriction mechanism 240 moves to the other side in the axial direction so that the restriction of the movement of the second sleeve 214 relative to the first rotating shaft 112 is released, as in the restriction mechanism 40 described in connection with the clutch mechanism shown in FIGS. 8 to 11 and 14. In addition, the driving mechanism 152 can also be driven (the shift member 152 can also be moved in the axial direction) by driving an actuator under electronic control or by the operator's operation.

Next, an operation of the transmission according to the present embodiment, in particular, an operation in the case where a change gear ratio of the transmission is changed is described. In the case described below, power from a driving source such as an engine or a motor is input to the second rotating shaft 162, and the power input to the second rotating shaft 162 is gear-shifted and then output from the first rotating shaft 112.

As shown in FIG. 20, when the supported portions 115 of the first sleeve 114 fit in the first non-engaging flutes 131 and when the supported portions 215 of the second sleeve 214 fit in the second non-engaging flutes 231, the engaging teeth 116 of the first sleeve 114 do not mesh with the engagement teeth 126 of the first gear member 122, and the engaging teeth 216 of the second sleeve 214 do not mesh with the engagement teeth 226 of the second gear member 222, as shown in FIG. 19. In this case, the transmission is in a neutral state, and the transmission of power between the second rotating shaft 162 and the first rotating shaft 112 is cut off. If the second rotating shaft 162 is rotated by the power from the driving source, the first gear member 122 and the second gear member 222 rotate in a predetermined direction (which is a clockwise direction when the first rotating shaft 112 is seen from one side (the left side in FIG. 19) in the axial direction in the example in FIG. 19). Since the gear ratio (the number of teeth of the first gear/the number of teeth of the third gear) from the third gear 164 to the first gear 124 is higher than the gear ratio (the number of teeth of the second gear/the number of teeth of the fourth gear) from the fourth gear 264 to the second gear 224, the rotation speed of the first gear member 122 in the predetermined direction is lower than that of the second gear member 222. No power is transmitted to the first rotating shaft 112, and the rotation of the first rotating shaft 112 has stopped.

In order to select a first gear stage (low-gear stage) as a gear shift stage of the transmission, the shift member 152 is first moved to the other side in the axial direction to press the first sleeve 114 to one side in the axial direction by the first link mechanism 154, as shown in FIG. 21. The first sleeve 114 moves to one side in the axial direction while compressing the first spring 138, and if the supported portions 115 of the first sleeve 114 move to the first flute branch portions 134 from the first non-engaging flutes 131, the engaging teeth 116 of the first sleeve 114 start to mesh with the engagement teeth 126 of the first gear member 122, and the first sleeve 114 and the first gear member 122 rotate and synchronize, as shown in FIG. 21.

Figure 24:
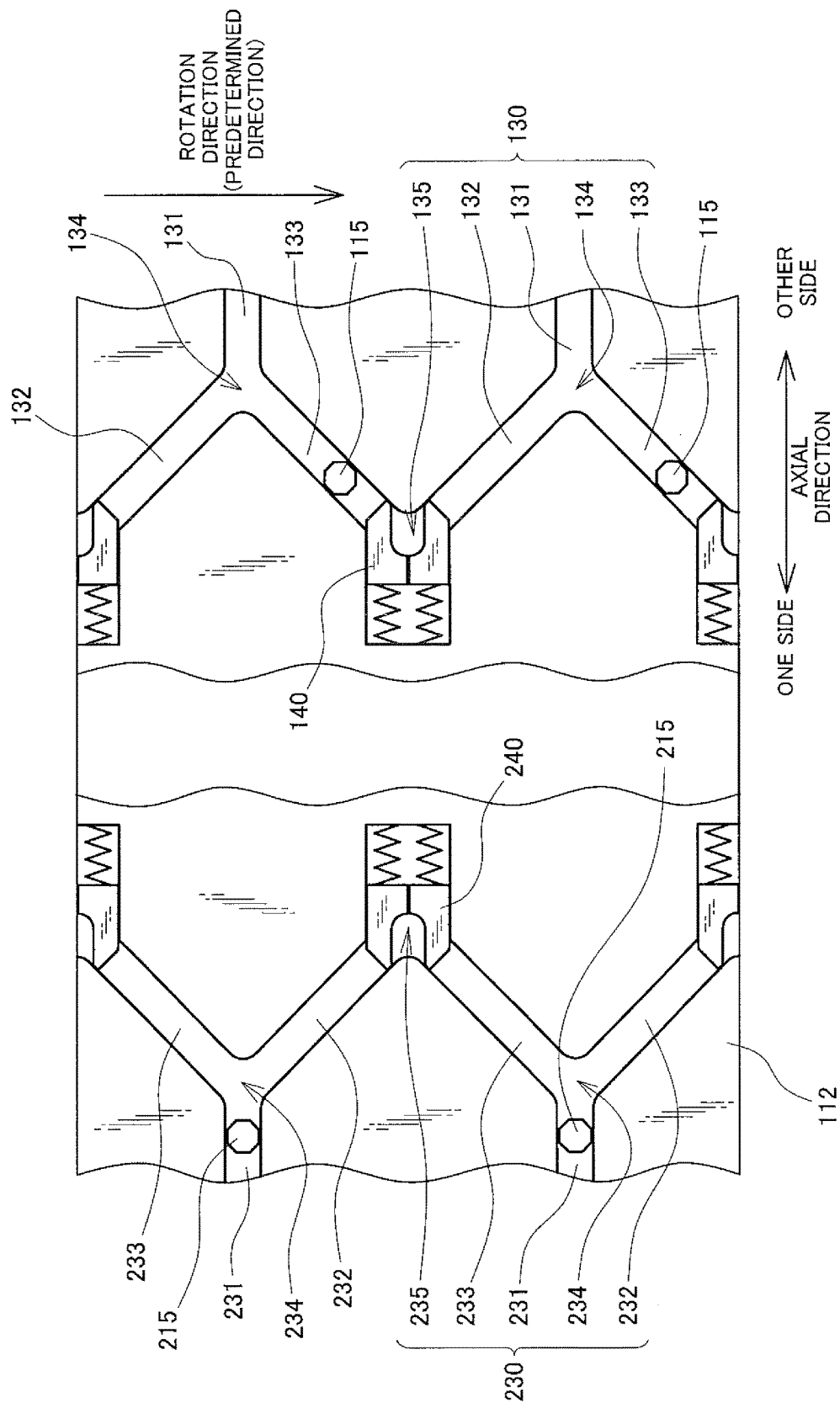
FIG. 24 is a diagram illustrating an operation of the transmission according to the embodiment of the present invention.

When the supported portions 115 of the first sleeve 114 have moved to the first flute branch portions 134, the supported portions 115 move to the first left-handed helical flutes 133 from the first flute branch portions 134 and then move to the first flute joining portions 135 along the extending direction of the first left-handed helical flutes 133, so that the first sleeve 114 relatively moves to one side in the axial direction while rotating relative to the first rotating shaft 112 in the predetermined direction, as shown in FIG. 24, because the rotation speed of the first gear member 122 in the predetermined direction is higher than that of the first rotating shaft 112. Consequently, the first sleeve 114 can be moved to one side in the axial direction while the rotation difference between the first sleeve 114 and the first rotating shaft 112 is permitted so that the rotation speed of the first sleeve 114 (the first gear member 122) in the predetermined direction may be higher than that of the first rotating shaft 112. If the first sleeve 114 moves to one side in the axial direction, the extent to which the engaging teeth 116 of the first sleeve 114 mesh with the engagement teeth 126 of the first gear member 122 increases.

Figure 25:
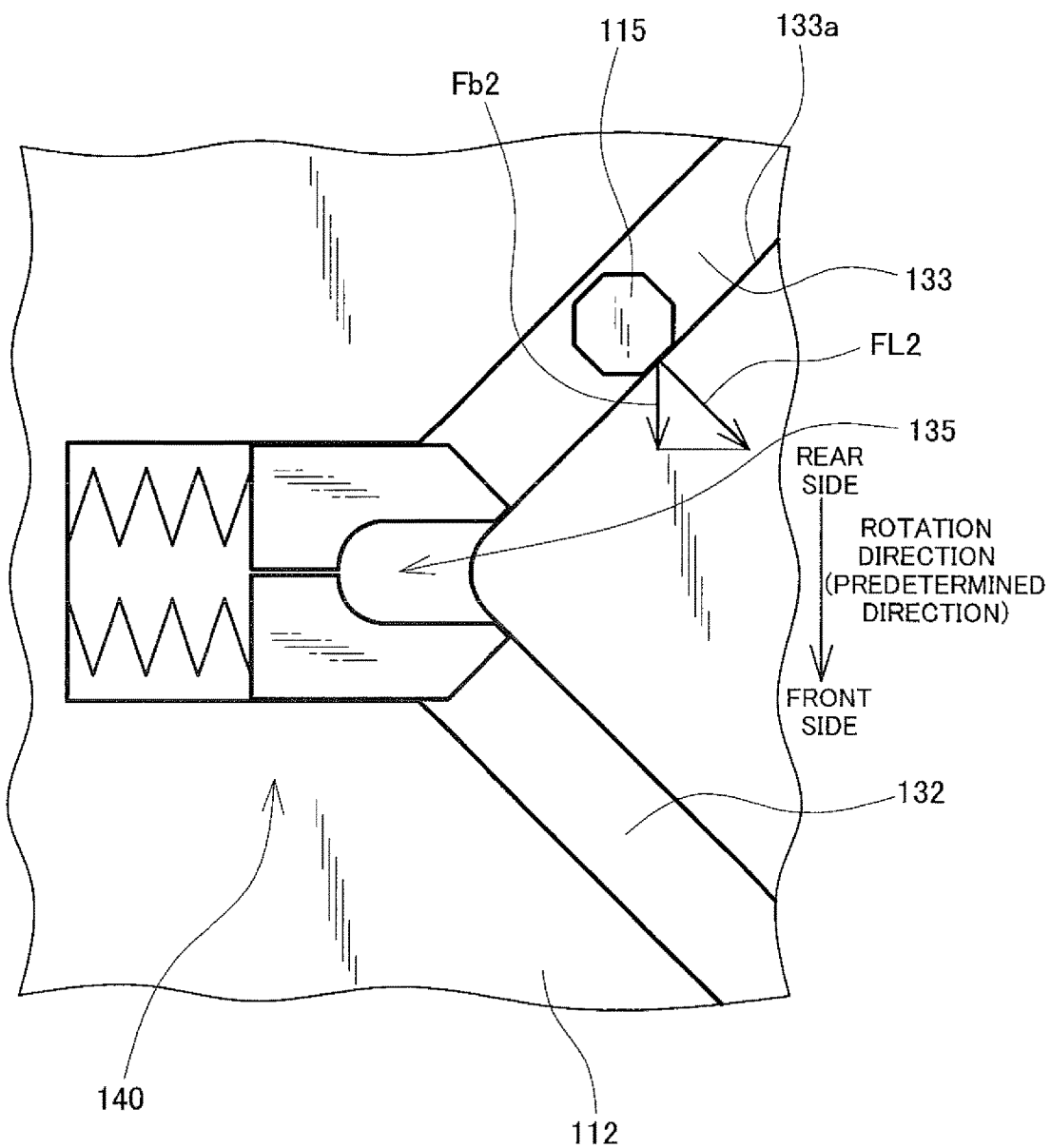
FIG. 25 is a diagram illustrating an operation of the transmission according to the embodiment of the present invention.

When the supported portions 115 of the first sleeve 114 move in the first left-handed helical flutes 133 toward the first flute joining portions 135, the first sleeve 114 moves to one side in the axial direction while pressing the first spring 138, and a load toward the other side in the axial direction is applied to the first sleeve 114 from the first spring 138. The supported portions 115 abut on side surfaces (first abutment surfaces) 133a of the first left-handed helical flutes 133 on the other side in the axial direction as shown in FIG. 25 due to the load of the first spring 138. Since the side surfaces 133a of the first left-handed helical flutes 133 are tilted toward the other side in the axial direction relative to the rotation direction (predetermined direction) of the first rotating shaft 112 from its front side to its rear side, press force FL2 applied to the side surfaces 133a of the first left-handed helical flutes 133 from the supported portions 115 has a component Fb2 in the rotation direction (predetermined direction) of the first rotating shaft 112. Therefore, torque in the predetermined direction is applied to the first rotating shaft 112 by the application of the load toward the other side in the axial direction to the first sleeve 114 from the first spring 138 attached to the first gear member 122. This torque in the predetermined direction can be used to transmit, to the first gear member 122, part of the power input to the second rotating shaft 162 from the driving source.

Figure 26:
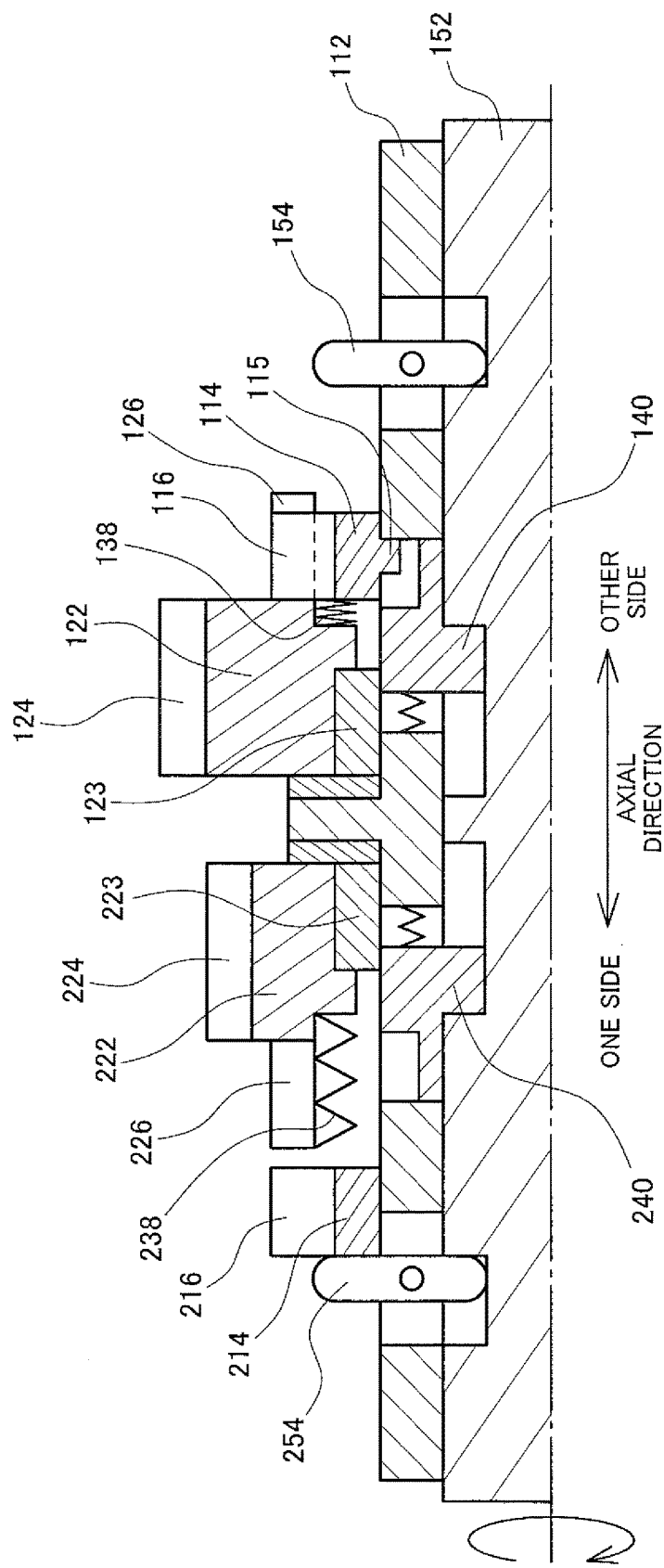
FIG. 26 is a diagram illustrating an operation of the transmission according to the embodiment of the present invention.

If the supported portions 115 of the first sleeve 114 have moved to the first flute joining portions 135, the engaging teeth 116 of the first sleeve 114 completely mesh with the engagement teeth 126 of the first gear member 122 as shown in FIG. 26. Moreover, the movement of the supported portions 115 along the first supporting flutes 130 is restricted by the first restriction mechanism 140, so that the movement of the first sleeve 114 relative to the first rotating shaft 112 is restricted. As a result, the first gear stage is selected, and the power input to the second rotating shaft 162 from the driving source is gear-shifted at the gear ratio from the third gear 164 to the first gear 124 and then transmitted to the first rotating shaft 112. In the first gear stage, the first gear member 122, the first sleeve 114, and the first rotating shaft 112 integrally rotate in a predetermined direction, and the speed of this rotation is lower than that of the second gear member 222.

In order to perform an upshift to switch from the first gear stage (low-gear stage) to a second gear stage (high-gear stage) as a gear shift stage of the transmission, the shift member 152 is first moved to one side in the axial direction to press the second sleeve 214 to the other side in the axial direction by the second link mechanism 254 and press the first restriction mechanism 140 to one side in the axial direction, as shown in FIG. 22. The second sleeve 214 moves to the other side in the axial direction while compressing the second spring 238, and if the supported portions 215 of the second sleeve 214 move to the second flute branch portion 234 from the second non-engaging flutes 231, the engaging teeth 216 of the second sleeve 214 start to mesh with the engagement teeth 226 of the second gear member 222, and the second sleeve 214 and the second gear member 222 rotate and synchronize, as shown in FIG. 22.

Figure 27:
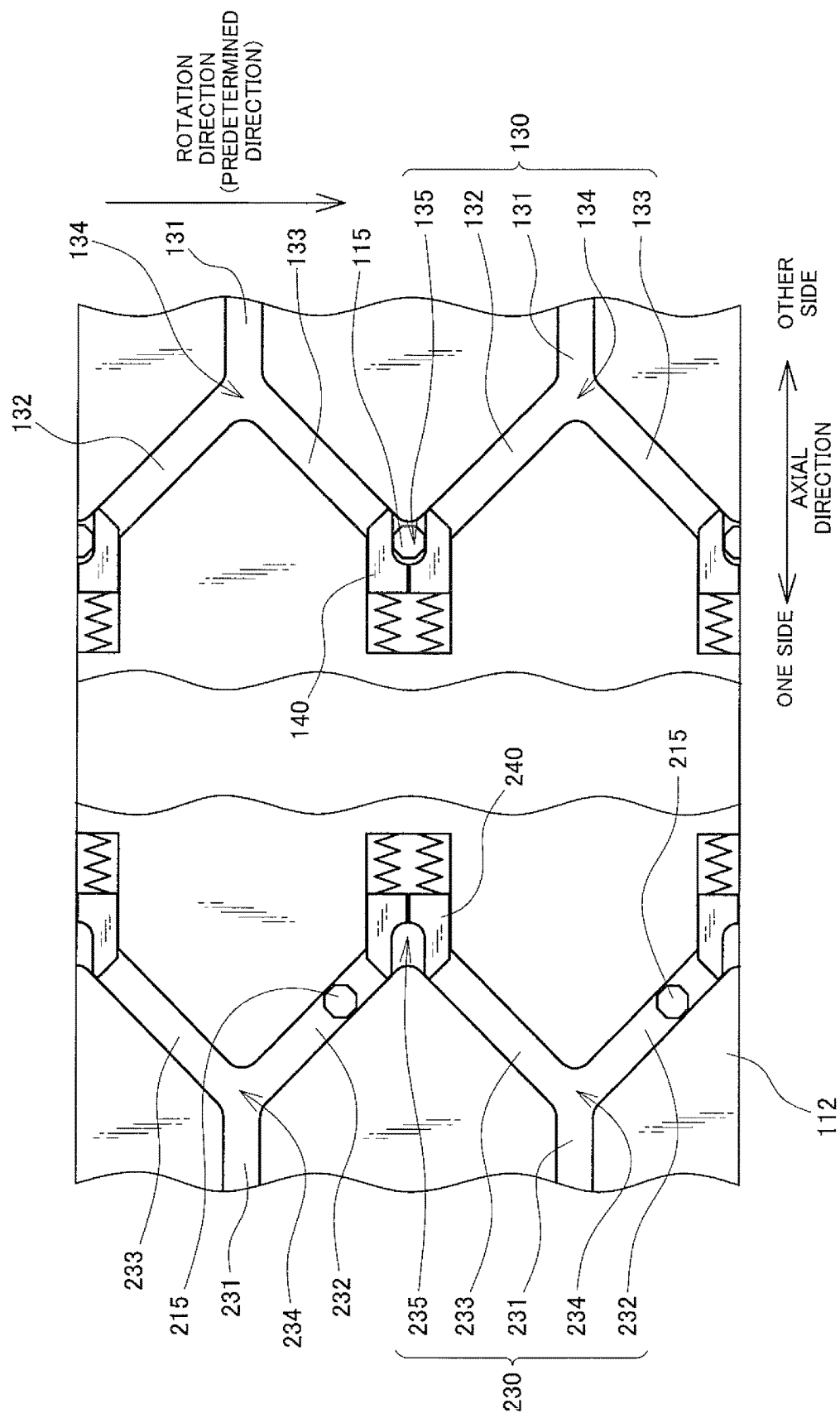
FIG. 27 is a diagram illustrating an operation of the transmission according to the embodiment of the present invention.

When the supported portions 215 of the second sleeve 214 have moved to the second flute branch portion 234, the supported portions 215 move to the second right-handed helical flutes 232 and then move to the second flute joining portions 235 along the extending direction of the second right-handed helical flutes 232, so that the second sleeve 214 relatively moves to the other side in the axial direction while rotating relative to the first rotating shaft 112 in the predetermined direction, as shown in FIG. 27, because the rotation speed of the second gear member 222 in the predetermined direction is higher than that of the first rotating shaft 112. Consequently, the second sleeve 214 can be moved to the other side in the axial direction while the rotation difference between the second sleeve 214 and the first rotating shaft 112 is permitted so that the rotation speed of the second sleeve 214 (the second gear member 222) in the predetermined direction may be higher than that of the first rotating shaft 112. If the second sleeve 214 moves to the other side in the axial direction, the extent to which the engaging teeth 216 of the second sleeve 214 mesh with the engagement teeth 226 of the second gear member 222 increases.

When the supported portions 215 of the second sleeve 214 move in the second right-handed helical flutes 232 toward the second flute joining portions 235, the shift member 152 is further moved to one side in the axial direction to further press the first restriction mechanism 140 to one side in the axial direction, as shown in FIG. 23. Then the first restriction mechanism 140 moves to one side in the axial direction so that the restriction of the movement of the first sleeve 114 relative to the first rotating shaft 112 is released.

Figure 28:
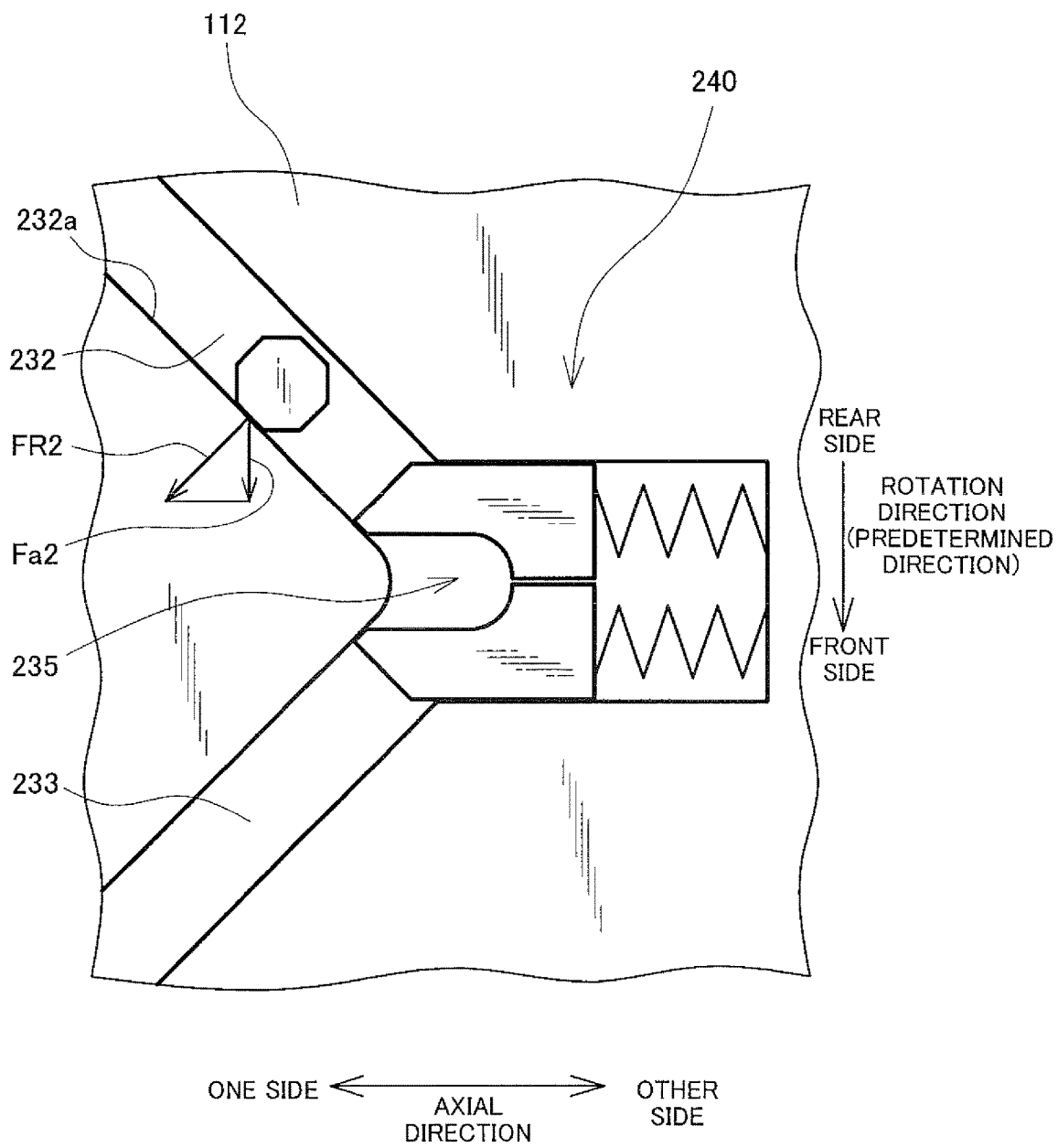
FIG. 28 is a diagram illustrating an operation of the transmission according to the embodiment of the present invention.

When the supported portions 215 of the second sleeve 214 move in the second right-handed helical flutes 232 toward the second flute joining portions 235, the second sleeve 214 moves to the other side in the axial direction while pressing the second spring 238, and the supported portions 215 abut on side surfaces (second abutment surfaces) 232a of the second right-handed helical flutes 232 on one side in the axial direction as shown in FIG. 28 due to the load of the second spring 238. Since the side surfaces 232a of the second right-handed helical flutes 232 are tilted toward one side in the axial direction relative to the rotation direction (predetermined direction) of the first rotating shaft 112 from its front side to its rear side, press force FR2 applied to the side surfaces 232a of the second right-handed helical flutes 232 from the supported portions 215 has a component Fa2 in the rotation direction (predetermined direction) of the first rotating shaft 112. Therefore, torque in the predetermined direction is applied to the first rotating shaft 112 by the application of the load toward one side in the axial direction to the second sleeve 214 from the second spring 238 attached to the second gear member 222. This torque in the predetermined direction can be used to transmit, to the first rotating shaft 112, part of the power input to the second rotating shaft 162 from the driving source, even if the restriction of the movement of the first sleeve 114 relative to the first rotating shaft 112 is released.

Figure 29:
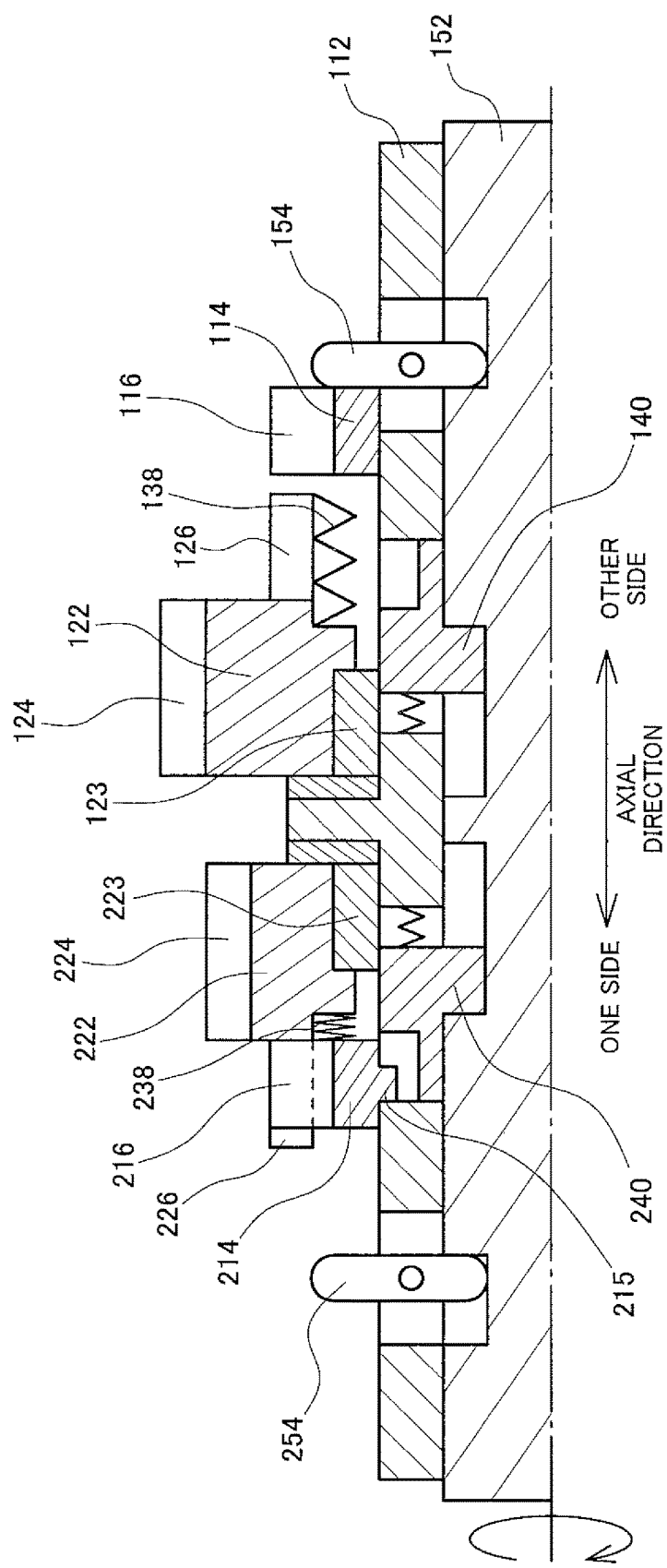
FIG. 29 is a diagram illustrating an operation of the transmission according to the embodiment of the present invention.
Figure 30:
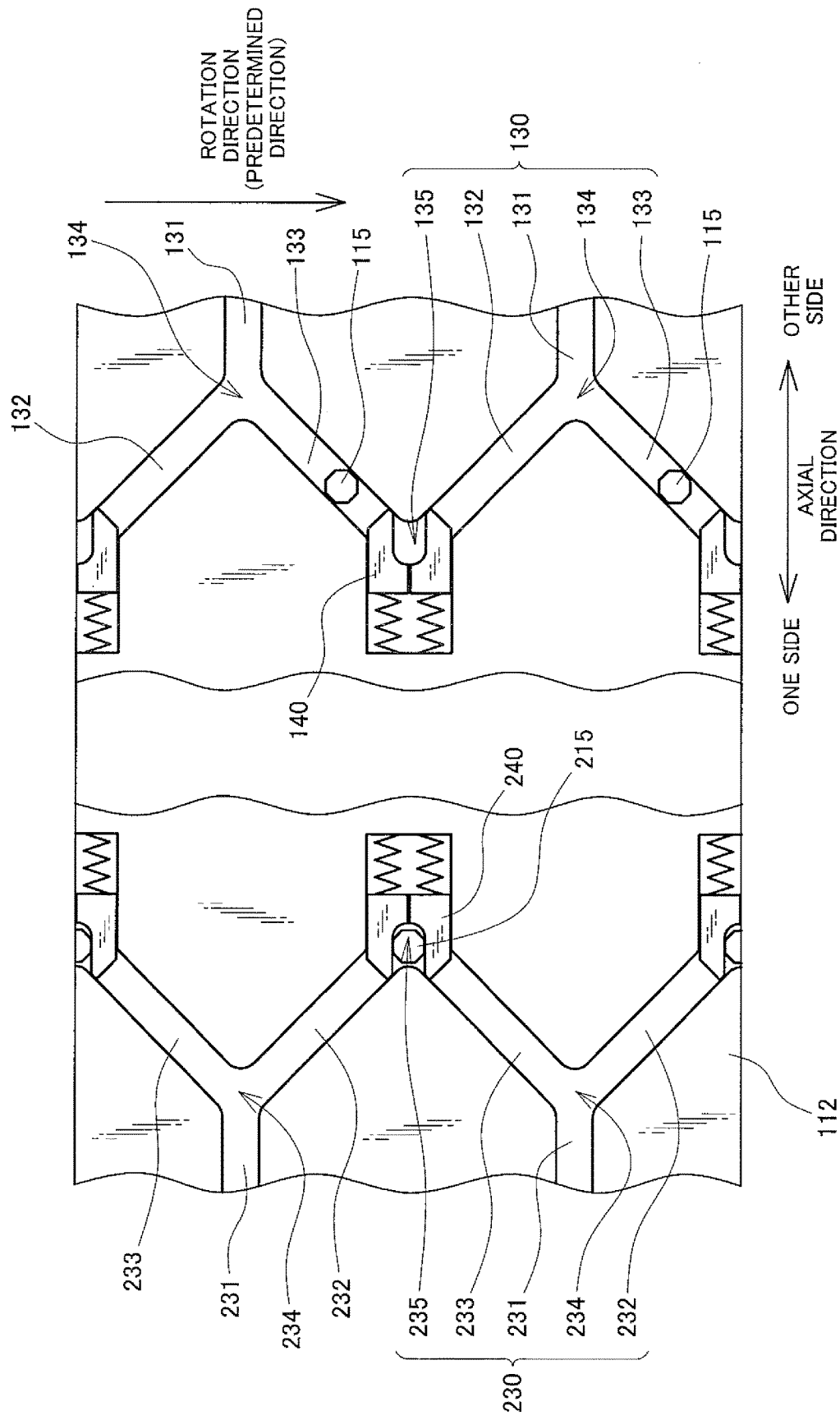
FIG. 30 is a diagram illustrating an operation of the transmission according to the embodiment of the present invention.

If the supported portions 215 of the second sleeve 214 have moved to the second flute joining portions 235, the engaging teeth 216 of the second sleeve 214 completely mesh with the engagement teeth 226 of the second gear member 222 as shown in FIG. 29. Moreover, the movement of the supported portions 215 along the second supporting flutes 230 is restricted by the second restriction mechanism 240, so that the movement of the second sleeve 214 relative to the first rotating shaft 112 is restricted. Since the rotation speed of the first rotating shaft 112 in the predetermined direction tends to be higher than that of the first gear member 122, the supported portions 115 of the first sleeve 114 move to the first left-handed helical flutes 133 from the first flute joining portions 135 and then move to the first flute branch portions 134 along the extending direction of the first left-handed helical flutes 133, so that the first sleeve 114 relatively moves to the other side in the axial direction while rotating relative to the first rotating shaft 112 in a direction reverse to the predetermined direction (the rotation direction of the first rotating shaft 112), as shown in FIG. 30. Consequently, the first sleeve 114 can be moved to the other side in the axial direction while the rotation difference between the first rotating shaft 112 and the first sleeve 114 is permitted. When the supported portions 115 of the first sleeve 114 move in the first left-handed helical flutes 133 toward the first flute branch portions 134, a load toward the other side in the axial direction is applied to the first sleeve 114 from the compressed first spring 138, so that the supported portions 115 abut on the side surfaces 133a of the first left-handed helical flutes 133. If the supported portions 115 of the first sleeve 114 reach the first flute branch portions 134, a load toward the other side in the axial direction is applied to the first sleeve 114 from the compressed spring 138. Thus, the supported portions 115 move to the first non-engaging flutes 131 from the first flute branch portions 134 toward the other side in the axial direction, so that the engaging teeth 116 of the first sleeve 114 do not mesh with the engagement teeth 126 of the first gear member 122. As a result of the operation described above, the upshift from the first gear stage to the second gear stage is performed, the power input to the second rotating shaft 162 from the driving source is gear-shifted at the gear ratio from the fourth gear 264 to the second gear 224 and then transmitted to the first rotating shaft 112. In the second gear stage, the second gear member 222, the second sleeve 214, and the first rotating shaft 112 integrally rotate in a predetermined direction, and the speed of this rotation is higher than that of the first gear member 122.

In order to perform a downshift to switch from the second gear stage to the first gear stage as a gear shift stage of the transmission, the shift member 152 is first moved to the other side in the axial direction to press the first sleeve 114 to one side in the axial direction by the first link mechanism 154 and press the second restriction mechanism 240 to the other side in the axial direction. The first sleeve 114 moves to one side in the axial direction while compressing the first spring 138, and if the supported portions 115 of the first sleeve 114 move to the first flute branch portions 134 from the first non-engaging flutes 131, the engaging teeth 116 of the first sleeve 114 start to mesh with the engagement teeth 126 of the first gear member 122, and the first sleeve 114 and the first gear member 122 rotate and synchronize.

Figure 31:
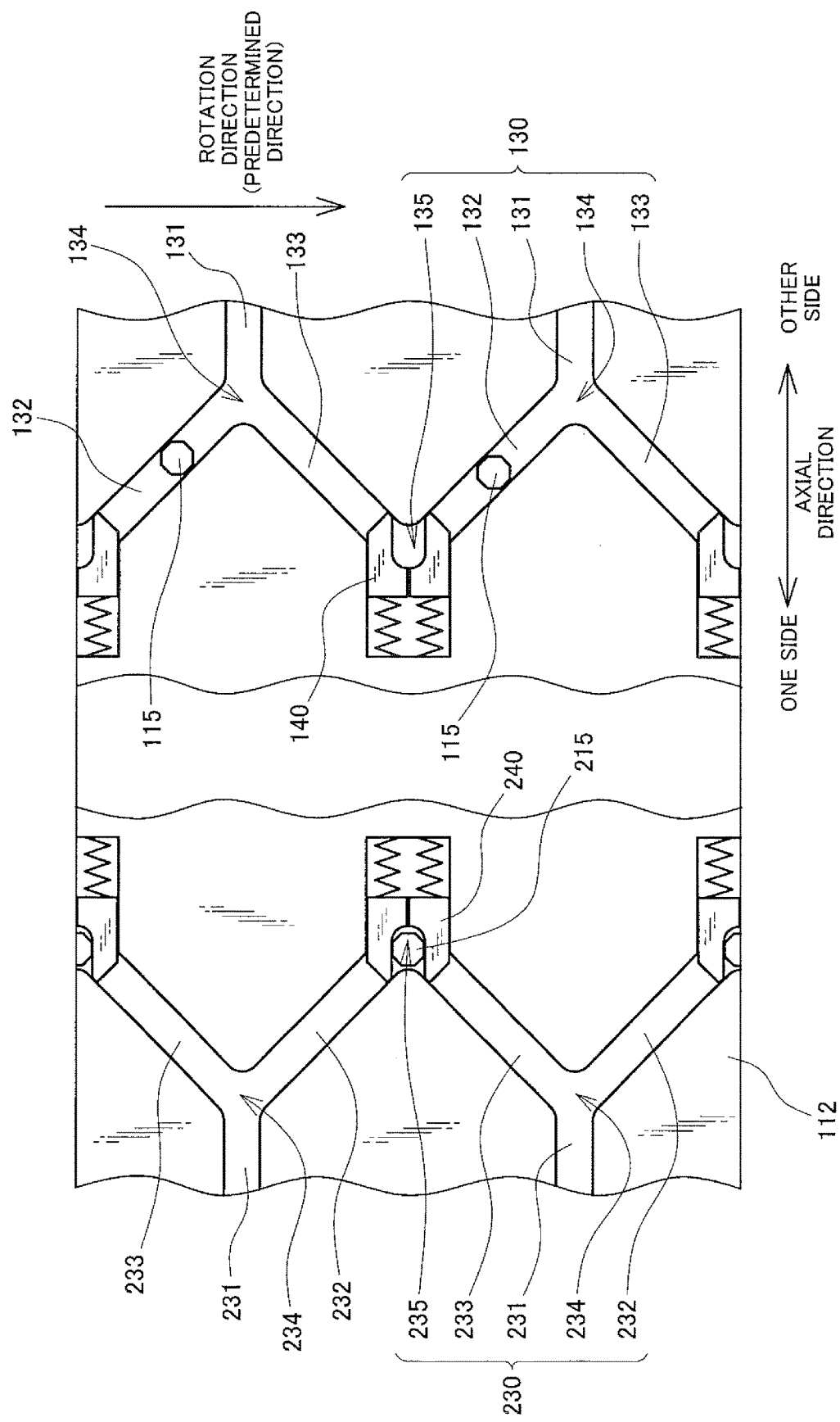
FIG. 31 is a diagram illustrating an operation of the transmission according to the embodiment of the present invention.

When the supported portions 115 of the first sleeve 114 have moved to the first flute branch portions 134, the supported portions 115 move to the first right-handed helical flutes 132 from the first flute branch portions 134 and then move to the first flute joining portions 135 along the extending direction of the first right-handed helical flute 132, so that the first sleeve 114 relatively moves to one side in the axial direction while rotating relative to the first rotating shaft 112 in the direction reverse to the predetermined direction, as shown in FIG. 31, because the rotation speed of the first gear member 122 in the predetermined direction is lower than that of the first rotating shaft 112. Consequently, the first sleeve 114 can be moved to one side in the axial direction while the rotation difference between the first sleeve 114 and the first rotating shaft 112 is permitted so that the rotation speed of the first sleeve 114 (the first gear member 122) in the predetermined direction may be lower than that of the first rotating shaft 112.

When the supported portions 115 of the first sleeve 114 move in the first right-handed helical flutes 132 toward the first flute joining portions 135, the shift member 152 is further moved to the other side in the axial direction to further press the second restriction mechanism 240 to the other side in the axial direction. Then the second restriction mechanism 240 moves to the other side in the axial direction so that the restriction of the movement of the second sleeve 214 relative to the first rotating shaft 112 is released.

Figure 32:
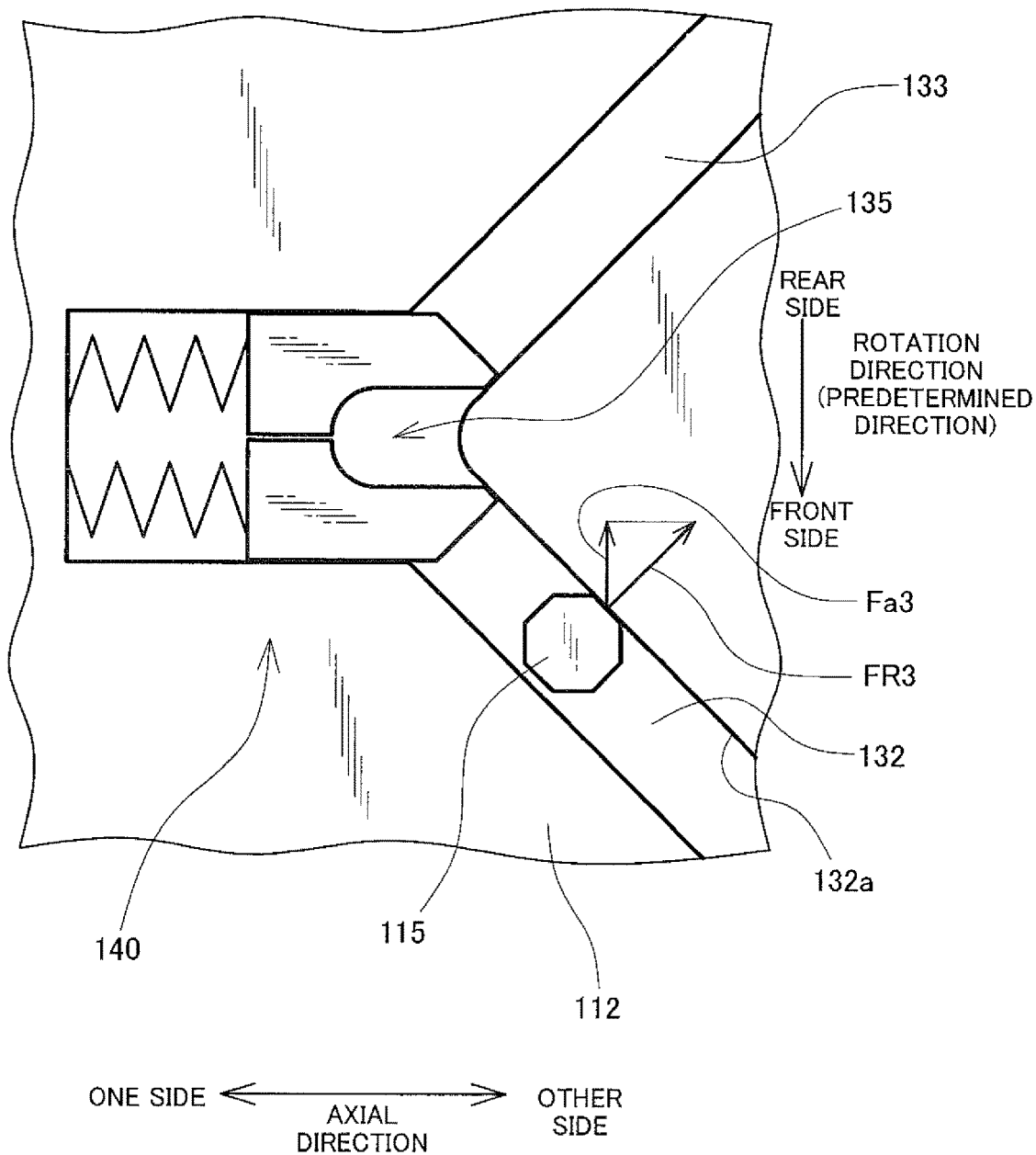
FIG. 32 is a diagram illustrating an operation of the transmission according to the embodiment of the present invention.
Figure 33:
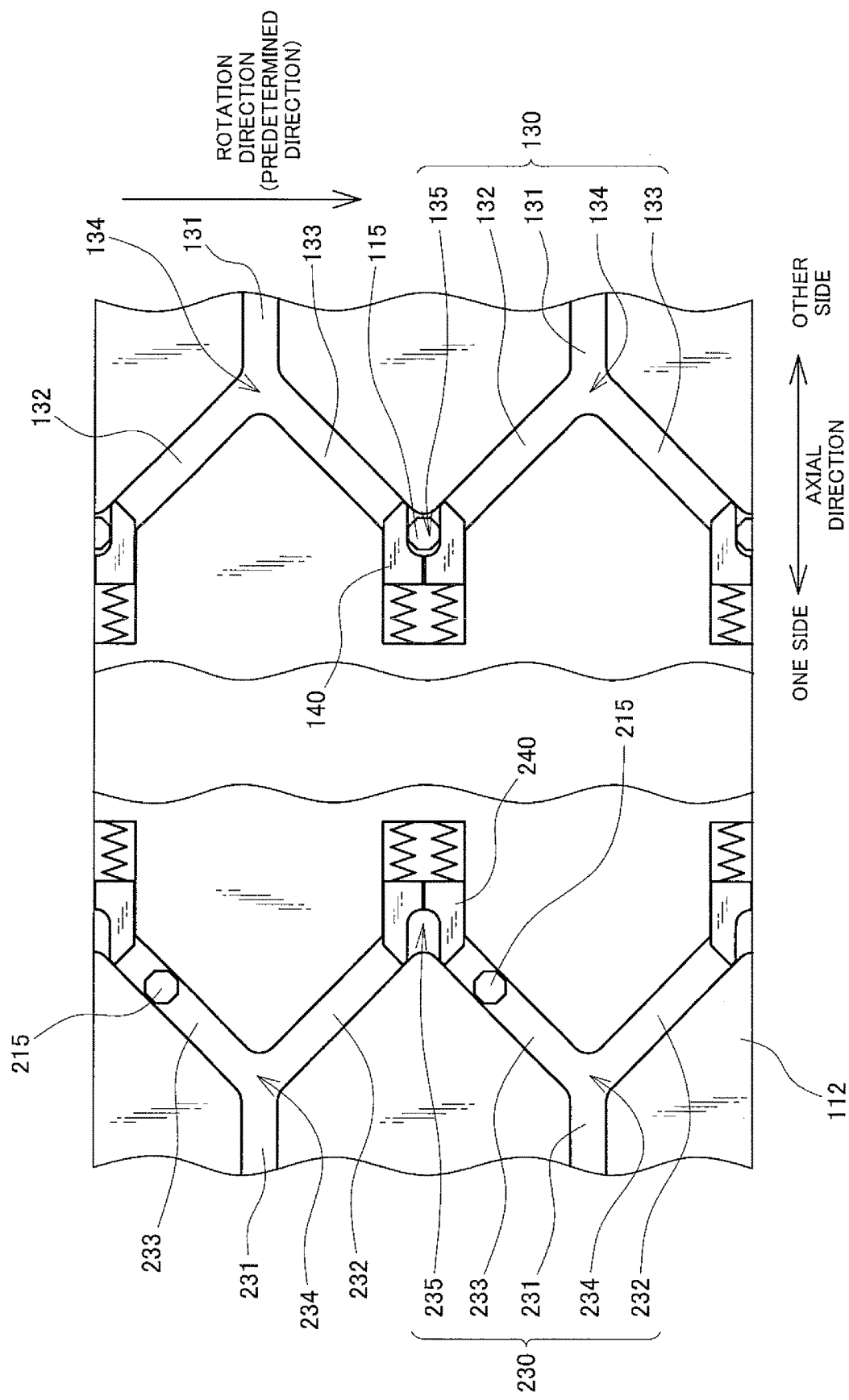
FIG. 33 is a diagram illustrating an operation of the transmission according to the embodiment of the present invention.

When the supported portions 115 of the first sleeve 114 move in the first right-handed helical flutes 132 toward the first flute joining portions 135, the first sleeve 114 moves to one side in the axial direction while pressing the first spring 138, and a load toward the other side in the axial direction is applied to the first sleeve 114 from the first spring 138. The supported portions 115 abut on side surfaces (first abutment surfaces) 132a of the first right-handed helical flutes 132 on the other side in the axial direction as shown in FIG. 32 due to the load of the first spring 138. Since the side surfaces 132a of the first right-handed helical flutes 132 are tilted toward one side in the axial direction relative to the rotation direction (predetermined direction) of the first rotating shaft 112 from its front side to its rear side, press force FR3 applied to the side surfaces 132a of the first right-handed helical flutes 132 from the supported portions 115 has a component Fa3 in the direction reverse to the rotation direction (predetermined direction) of the first rotating shaft 112, and torque in the direction reverse to the predetermined direction is applied to the first rotating shaft 112.

If the supported portions 115 of the first sleeve 114 have moved to the first flute joining portions 135, the engaging teeth 116 of the first sleeve 114 completely mesh with the engagement teeth 126 of the first gear member 122. Moreover, the movement of the supported portions 115 along the first supporting flutes 130 is restricted by the first restriction mechanism 140, so that the movement of the first sleeve 114 relative to the first rotating shaft 112 is restricted. Since the rotation speed of the first rotating shaft 112 in the predetermined direction tends to be lower than that of the second gear member 222, the supported portions 215 of the second sleeve 214 move to the second left-handed helical flute 233 from the second flute joining portions 235 and then move to the second flute branch portion 234 along the extending direction of the second left-handed helical flute 233, so that the second sleeve 214 relatively moves to one side in the axial direction while rotating relative to the first rotating shaft 112 in the predetermined direction. Consequently, the second sleeve 214 can be moved to one side in the axial direction while the rotation difference between the first rotating shaft 112 and the second sleeve 214 is permitted. When the supported portions 215 of the second sleeve 214 move in the second left-handed helical flute 233 toward the second flute branch portion 234, a load toward one side in the axial direction is applied to the second sleeve 214 from the compressed second spring 238, so that the supported portions 215 abut on side surfaces (second abutment surfaces) of the second left-handed helical flute 233 on one side in the axial direction. If the supported portions 215 of the second sleeve 214 reach the second flute branch portion 234, a load toward one side in the axial direction is applied to the second sleeve 214 from the compressed second spring 238. Thus, the supported portions 215 move to the second non-engaging flutes 231 from the second flute branch portion 234 toward one side in the axial direction, so that the engaging teeth 216 of the second sleeve 214 do not mesh with the engagement teeth 226 of the second gear member 222. As a result of the operation described above, the downshift from the second gear stage to the first gear stage is performed.

According to the present embodiment described above, the engaging operation and the releasing operation of the first rotating shaft 112 and the first gear member 122 can be performed regardless of the condition of rotation speeds of the first rotating shaft 112 and the first gear member 122, and the first gear stage can be selected and deselected. Similarly, the engaging operation and the releasing operation of the first rotating shaft 112 and the second gear member 222 can be performed regardless of the condition of rotation speeds of the first rotating shaft 112 and the second gear member 222, and the second gear stage can be selected and deselected. Therefore, it is possible to select the first gear stage from the neutral state and perform the upshift from the first gear stage to the second gear stage and the downshift from the second gear stage to the first gear stage regardless of the condition of rotation speeds of the first rotating shaft 112 and the first and second gear members 122 and 222. Moreover, when the first gear stage is selected, the movement of the first sleeve 114 relative to the first rotating shaft 112 is restricted by the first restriction mechanism 140, so that no external power is needed to maintain the engaged state of the first rotating shaft 112 and the first gear member 122. When the second gear stage is selected, the movement of the second sleeve 214 relative to the first rotating shaft 112 is restricted by the second restriction mechanism 240, so that no external power is needed to maintain the engaged state of the first rotating shaft 112 and the second gear member 222. In the neutral state as well, no external power is needed to maintain the released state of the first rotating shaft 112 and the first and second gear members 122 and 222.

When the supported portions 115 of the first sleeve 114 move in the first right-handed helical flutes 132 or the first left-handed helical flutes 133, the supported portions 115 abut on the side surfaces 132a of the first right-handed helical flutes 132 or the side surfaces 133a of the first left-handed helical flutes 133 due to the load toward the other side in the axial direction applied to the first sleeve 114 from the first spring 138, so that torque is applied to the first rotating shaft 112. When the supported portions 215 of the second sleeve 214 move in the second right-handed helical flutes 232 or the second left-handed helical flute 233 as well, the supported portions 215 abut on the side surfaces 232a of the second right-handed helical flutes 232 or the side surfaces of the second left-handed helical flutes 233 due to the load toward one side in the axial direction applied to the second sleeve 214 from the second spring 238, so that torque is applied to the first rotating shaft 112. Owing to this torque, during the selection of the first gear stage from the neutral state, during the upshift from the first gear stage to the second gear stage, and during the downshift from the second gear stage to the first gear stage, respectively, it is possible to transmit part of power between the first rotating shaft 112 and the second rotating shaft 162, and reduce a gear-shift shock that occurs at the time of the switching between the first gear stage and the second gear stage.

In the transmission described above, the first spring 138 for applying the load in the direction away from the first gear member 122 to the first sleeve 114 can be attached to the first sleeve 114, and the second spring 238 for applying the load in the direction away from the second gear member 222 to the second sleeve 214 can be attached to the second sleeve 214. It is also possible to provide a damper instead of the first spring 138 to apply the load in the direction away from the first gear member 122 to the first sleeve 114. It is also possible to provide a damper instead of the second spring 238 to apply the load in the direction away from the second gear member 222 to the second sleeve 214.

In the transmission described above, the power input to the second rotating shaft 162 from the driving source is gear-shifted and then output from the first rotating shaft 112. However, the power input to the first rotating shaft 112 from the driving source can also be gear-shifted and then output from the second rotating shaft 162.

In the transmission described above, the gear stage is switched to two stages (the first gear stage and the second gear stage). However, the gear stage of the transmission can also be switched to three or more stages.

While the mode for carrying out the present invention has been described, the present invention is not in the least limited to such an embodiment. It should be understood that the present invention can be carried out in various forms without departing from the spirit thereof.

REFERENCE SIGNS LIST 12, 112: first rotating shaft, 14: sleeve, 15, 115, 215: supported portion, 16, 116, 216: engaging teeth, 22, 162: second rotating shaft, 23, 123, 233: bearing, 26, 126, 226: engagement teeth, 30: supporting flute, 31: non-engaging flute, 32: right-handed helical flute, 33: left-handed helical flute, 34: flute branch portion, 35: flute joining portion, 38, 44, 45: spring, 40: restriction mechanism, 41: holding portion, 42, 43: restriction member, 46, 47: tapered surface, 52, 152: driving mechanism (shift member), 54: link mechanism, 114: first sleeve, 122: first gear member, 124: first gear, 130: first supporting flute, 131: first non-engaging flute, 132: first right-handed helical flute, 133: first left-handed helical flute, 134: first flute branch portion, 135: first flute joining portion, 138: first spring, 140: first restriction mechanism, 154: first link mechanism, 164: third gear, 214: second sleeve, 222: second gear member, 224: second gear, 230: second supporting flute, 231: second non-engaging flute, 232: second right-handed helical flute, 233: second left-handed helical flute, 234: second flute branch portion, 235: second flute joining portion, 238: second spring, 240: second restriction mechanism, 254: second link mechanism, 264 fourth gear.

The invention claimed is:

1. A clutch mechanism comprising:
a first rotation member;
a movable member provided with an engaging portion; and
a second rotation member provided with an engagement portion configured to engage with the engaging portion of the movable member,
wherein the first rotation member is provided with a supporting portion which supports the movable member, and the movable member is movable relative to the first rotation member along the supporting portion,
the supporting portion includes
a non-engaging portion which supports the movable member at a position where the engaging portion of the movable member does not engage with the engagement portion of the second rotation member,
a right-handed helical portion and a left-handed helical portion located closer to the second rotation member side than the non-engaging portion,
a branch portion which branches into the right-handed helical portion and the left-handed helical portion from the non-engaging portion, and
a joining portion which is located closer to the second rotation member side than the branch portion and in which the right-handed helical portion and the left-handed helical portion join, and
when the support position where the movable member is supported by the supporting portion has moved from the non-engaging portion to the branch portion, the engagement between the engaging portion of the movable member and the engagement portion of the second rotation member starts,
the clutch mechanism further comprising a restriction mechanism which restricts the movement of the movable member relative to the first rotation member when the support position where the movable member is supported by the supporting portion is a joining portion.

2. The clutch mechanism according to claim 1, further comprising
a load generation mechanism which applies, to the movable member, a load in a direction away from the second rotation member.

3. The clutch mechanism according to claim 2, wherein
the movable member is provided with a supported portion which is supported by the supporting portion, and
an abutment surface, on which the supported portion abuts when the load is applied by the load generation mechanism to the movable member, is formed in at least one of the right-handed helical portion and the left-handed helical portion.

4. A transmission comprising:
a first rotation member;
a first movable member provided with a first engaging portion;
a first gear member which includes a first gear and which is provided with a first engagement portion configured to engage with the first engaging portion of the first movable member;
a second movable member provided with a second engaging portion;
a second gear member which includes a second gear and which is provided with a second engagement portion configured to engage with the second engaging portion of the second movable member; and
a second rotation member which rotates together with a third gear that engages with the first gear and a fourth gear that engages with the second gear,
wherein a gear ratio between the first gear and the third gear is different from a gear ratio between the second gear and the fourth gear,
the first rotation member is provided with a first supporting portion which supports the first movable member, and a second supporting portion which supports the second movable member, the first movable member being movable relative to the first rotation member along the first supporting portion, the second movable member being movable relative to the first rotation member along the second supporting portion,
the first supporting portion includes
a first non-engaging portion which supports the first movable member at a position where the first engaging portion of the first movable member does not engage with the first engagement portion of the first gear member,
a first right-handed helical portion and a first left-handed helical portion located closer to the first gear member side than the first non-engaging portion,
a first branch portion which branches into the first right-handed helical portion and the first left-handed helical portion from the first non-engaging portion, and
a first joining portion which is located closer to the first gear member side than the first branch portion and in which the first right-handed helical portion and the first left-handed helical portion join,
when the support position where the first movable member is supported by the first supporting portion has moved from the first non-engaging portion to the first branch portion, the engagement between the first engaging portion of the first movable member and the first engagement portion of the first gear member starts,
the second supporting portion includes
a second non-engaging portion which supports the second movable member at a position where the second engaging portion of the second movable member does not engage with the second engagement portion of the second gear member,
a second right-handed helical portion and a second left-handed helical portion located closer to the second gear member side than the second non-engaging portion,
a second branch portion which branches into the second right-handed helical portion and the second left-handed helical portion from the second non-engaging portion, and
a second joining portion which is located closer to the second gear member side than the second branch portion and in which the second right-handed helical portion and the second left-handed helical portion join, and
when the support position where the second movable member is supported by the second supporting portion has moved from the second non-engaging portion to the second branch portion, the engagement between the second engaging portion of the second movable member and the second engagement portion of the second gear member starts
the transmission further comprising
a first restriction mechanism which restricts the movement of the first movable member relative to the first rotation member when the support position where the first movable member is supported by the first supporting portion is a first joining portion, and
a second restriction mechanism which restricts the movement of the second movable member relative to the first rotation member when the support position where the second movable member is supported by the second supporting portion is a second joining portion.

5. The transmission according to claim 4, further comprising
a first load generation mechanism which applies, to the first movable member, a load in a direction away from the first gear member, and
a second load generation mechanism which applies, to the second movable member, a load in a direction away from the second gear member.

6. The transmission according to claim 5, wherein
the first movable member is provided with a first supported portion which is supported by the first supporting portion,
the second movable member is provided with a second supported portion which is supported by the second supporting portion,
a first abutment surface, on which the first supported portion abuts when the load is applied by the first load generation mechanism to the first movable member, is formed in at least one of the first right-handed helical portion and the first left-handed helical portion, and
a second abutment surface, on which the second supported portion abuts when the load is applied by the second load generation mechanism to the second movable member, is formed in at least one of the second right-handed helical portion and the second left-handed helical portion.

\* \* \* \* \*